US005768149A

United States Patent [19]
Umney et al.

[11] Patent Number: 5,768,149
[45] Date of Patent: Jun. 16, 1998

[54] SYSTEMS AND METHODS FOR AUTOMATED TUBE DESIGN

[75] Inventors: Michael A. Umney, Mason; John J. Wright, Monroe; Eric G.V. Hall, Milford; Kenneth J. Ashton, West Chester, all of Ohio

[73] Assignee: General Electric Company, Cincinnati, Ohio

[21] Appl. No.: 575,923

[22] Filed: Dec. 20, 1995

[51] Int. Cl.⁶ .................................................. G06F 17/50
[52] U.S. Cl. ............................................................ 364/512
[58] Field of Search ............................ 364/512, 518; 235/151.1; 395/500, 900, 902, 904, 919, 921, 964

[56] References Cited

U.S. PATENT DOCUMENTS

| | | | |
|---|---|---|---|
| 3,867,616 | 2/1975 | Korelitz et al. | 235/151.1 |
| 4,928,233 | 5/1990 | Millis | 364/512 |
| 5,260,883 | 11/1993 | Wilson | 364/512 |
| 5,293,479 | 3/1994 | Quintero et al. | 364/512 |
| 5,504,687 | 4/1996 | Wolf | 364/512 |
| 5,517,428 | 5/1996 | Williams | 364/512 |
| 5,555,406 | 9/1996 | Nozawa | 364/512 |

Primary Examiner—Kevin J. Teska
Assistant Examiner—Matthew Loppnow
Attorney, Agent, or Firm—Andrew C. Hess; Patrick R. Scanlon

[57] ABSTRACT

A design system for designing a tube for a gas turbine engine is described. The system including, in one embodiment, a computer workstation having a plurality of executable modules stored therein. The modules include a tube design module for routing a tube between tube fittings, a tube editing module for editing tube assembly geometry, and a tube detailing module for preparing detail drawings.

14 Claims, 15 Drawing Sheets

1. TUBE PARAMETERS
2. TUBE DEFINITION
3. FITTING PLACEMENT
4. TCP CREATION
5. TCP NAMING
6. INSPECTION CS
7. DATA FILES GENERATION
8. HOSE ASSEMBLY NAME

1. TUBE PARAMETERS
2. TUBE DEFINITION
3. FITTING PLACEMENT
4. TCP CREATION
5. TCP NAMING
6. INSPECTION CS
7. DATA FILES GENERATION
8. HOSE ASSEMBLY NAME

FIG. 3

ANALYSIS PARAMETERS

Pressure (PSIA)
Temperature (F)
Operating fluid

OK  BACK  CANCEL

FIG. 4

SEGMENT

CONTROL POINTS

BEND RADIUS

TUBE PARAMETERS

Material
Outer Dia
Wall Thickness
Part No
Material Spec

UPDATE PARAMETERS

OK  BACK  CANCEL

FIG. 5

FITTING POSITION

ASSEMBLY METHOD
IMPORT          COMPONENT

POSITIONING METHOD
FREE POSITION
FITTING TO FITTING
COORDINATE SYSTEM
AT SEGMENT END
ON SEGMENT

OK  CANCEL

STANDARD FITTING

BASIC CRITERIA

Material ☐  Dia 1 ☐
Wall Thickness ☐  Dia 2 ☐
Dia 3 ☐

ADDITIONAL CRITERIA

Title ☐

SELECTION
J536P01,J1316P04,MS27074-4C,30200
J536P02,J1316P05,MS27074-5C,30200
J536P03,J1316P06,MS27074-6C,30200
J536P04,J1316P08,MS27074-8C,30200

FITTING DETAIL
dia .25; wall 0.035; attach weld; material cres

[OK] [BACK] [CANCEL]

FIG. 7

USER DEFINED FITTING

More than one port direction TCP ?
◇ YES ◆ NO

Bolt location TCP present ?
◇ YES ◆ NO

USER DEFINED FITTING

TCP COUNT [      ]

TCP TYPE
- ON TUBE CL ◆
- OFF TUBE CL ◇
- MALE FITTING PORT ◇
- FEMALE FITTING PORT ◇
- TUBE FITTING JOINT ◇
- PORT DIRECTION ◇
- BOLT LOCATION ◇
- HOSE FITTING PORT ◇
- FLANGE MALE PORT ◇
- FLANGE FEMALE PORT ◇
- SWIVEL FLANGE PORT ◇
- GASKET FACE ◇

[OK] [BACK] [DONE]

FIG. 11

CREATE TCP

SEGMENT [      ]

- VERTEX ◆
- REFERENCE ◇
- LOCATER PAIR ◇

[OK] [CANCEL]

FIG. 12

CREATE TCP NAME

[AUTO] [MANUAL]

- ALL ◆
- UNNAMED ONLY ◇

TCP NAME [      ]

[OK] [CANCEL]

FIG. 13

INSPECTION CS
AUTOMATIC ◆
MANUAL ◇
[OK] [CANCEL]

FIG. 14

DATA FILES
LISTING DEVICE ◆   FILE ◇
PARTS LIST ◆
ENACT TRANSACTION DATA ◇
TRANSFORMED COORDINATES ◇
CENTER OF GRAVITY ◇
FILE NAME [____]
[EDIT PARTS LIST]
[OK] [CANCEL]

FIG. 15

VALIDATION
ERROR/WARNING
MESSAGE
[PREVIOUS] [NEXT]
[BACK]

1. DELETE FITTING
2. MOVE FITTING
3. EDIT COMPONENT DATA
4. TUBE PARAMETERS
5. TRANSFORM SEGMENT
6. EDIT BEND RADIUS
7. DELETE SEGMENT
8. MOVE VERTEX
9. DELETE VERTEX
10. CONNECT
11. DISCONNECT
12. SPLIT SEGMENT
13. CONCATENATE SEGMENT

FIG. 21
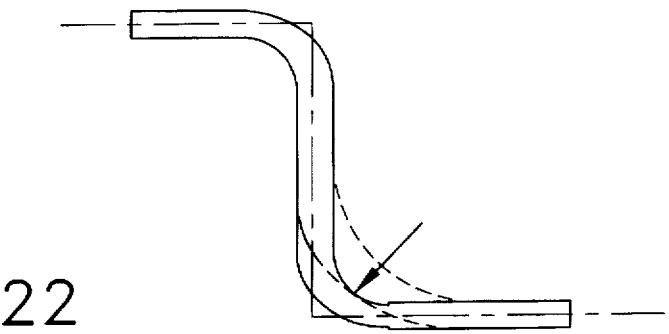
FIG. 22
FIG. 23
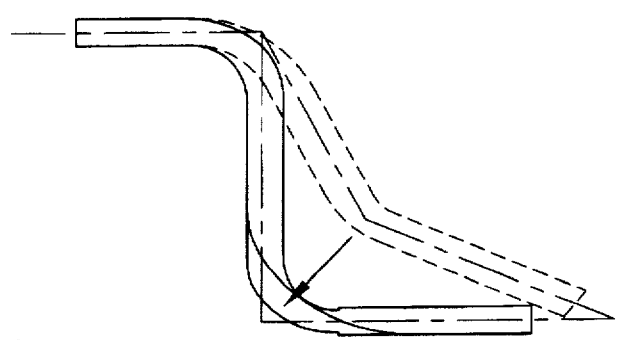
FIG. 24

SYSTEMS AND METHODS FOR AUTOMATED TUBE DESIGN

FIELD OF THE INVENTION

This invention relates generally to gas turbines and more particularly, to automated apparatus and methods for designing tube assemblies for gas turbines.

BACKGROUND OF THE INVENTION

Configuration design in a gas turbine engine involves design of tubes carrying fuel, lubricants and cooling fluids in the engine. An inseparable tube assembly for an engine typically includes tube segments and fittings welded or braced together. The segments and fittings generally are inseparable after assembly. Brackets hold the inseparable tube assembly to the engine.

A tube segment is a continuous constant diameter run of tube between fittings. The tube segments may have straight runs and bends. Segments are connected together through fittings, such as tees, a reducers, and saddles. Inseparable tube assemblies are connected to other inseparable tube assemblies through end fittings.

It would be desirable to provide an interactive configuration design system (ICDS) which has functionality to run a tube between fittings, place fittings on the tube assembly, edit an existing tube fitting configuration, and connect and disconnect fittings to tube runs. It would also be desirable to provide such a system which, after a tube inseparable assembly is created, may also be used to generate a detailed drawings for manufacturing and assembly. Such functionality preferably would be provided in a system which requires little user input.

SUMMARY OF THE INVENTION

These and other objects may be attained by an interactive configuration design system (ICDS) having functionality to run a tube between fittings, place fittings on the tube assembly, edit an existing tube fitting configuration, and connect and disconnect fittings to tube runs. After a tube inseparable assembly is created, the ICDS may also be used to generate a detailed drawing for manufacturing and assembly. The system can also be used for drawing format generation and annotation. The detailing functions can be performed with little user input. The ICDS tubing system also has functionality to design and detail hose and tube hose assemblies.

More particularly, the subject ICDS has three modules generally referred to as the tube design, or creation, module, the tube editing module, and the tube detailing module. The tube design module helps a designer route a tube between tube fittings. Tube routing is accomplished using a series of points along the tube run or identifying a series of lines and arcs which define the center line of the segment. The tubing system builds and maintains the connectivity information of the tube-fitting network.

The tube editing module provides functionality to edit tube assembly geometry. The tube detailing module helps a user prepare detail drawings of tube assemblies. Using the tube network information built by the tube design module, a series of charts can be generated for tube bending and inspection operations and placed on the face of the drawing.

BRIEF DESCRIPTION OF THE DRAWINGS

FIG. 3 is the analysis parameters dialog.
FIG. 4 is the tube definition dialog.
FIG. 5 is the fitting positioning dialog.
FIG. 7 is the standard fitting selection dialog.
FIG. 9 is a user defined fitting type dialog.
FIG. 10 are TCPs for the user defined fitting dialog.
FIG. 11 is a TCP creation dialog.
FIG. 12 is a name TCPs dialog.
FIG. 13 is an inspection coordinate system dialog.
FIG. 14 is a data file generation dialog.
FIG. 15 is a tube validation dialog.
FIG. 21 is an edit component data dialog.
FIG. 22 illustrates the bend radius of a tube at a vertex.
FIG. 23 is an edit bend radius dialog.
FIG. 24 illustrates moving a segment vertex.

DETAILED DESCRIPTION OF THE DRAWINGS

Figure 1:
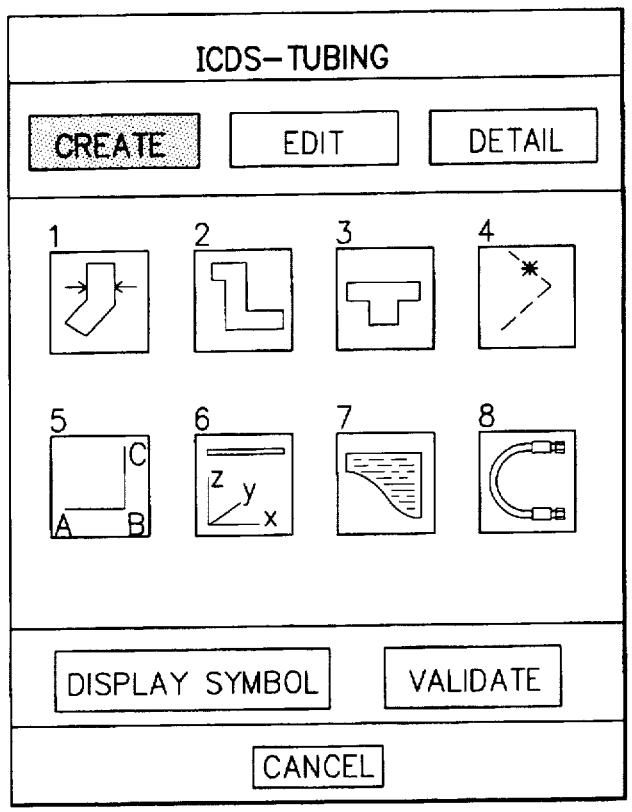
FIG. 1 is the ICDS tubing system main dialog.

The subject ICDS tubing system, in one form, is implemented as a user function sub-system to the Unigraphics CAD/CAM software (UG), which is commercially available from the Unigraphics Division of Electronic Data Systems. The system, in the one form, is implemented in 'C' programming language and has a Motif based interface following Unigraphics V10 conventions. More specifically, in one embodiment, the ICDS system could be implemented on a HP 9000/750 Workstation configured with HP-UK Version 9.03, an ANSI C Compiler-HP-UX9.03, a HP-UX X-Motif Tool kit VI.2 and Unigraphics 10.3.

Of course, the present ICDS tubing system could be implemented in many other environments. Although the following detailed discussion describes the subject system in the Unigraphics environment, it should be recognized that the system could be implemented in other known environments.

With respect to the one embodiment, the system communicates with users through dialogs similar to the motif based user dialogs of Unigraphics. The user displays the name of all the ironic dialog items by clicking the third mouse button on them. When the Unigraphics single entity selection dialog is used by the tubing system, a confirmation dialog is used with the entity highlighted in the graphic screen. The Unigraphics single entity selection function cannot select groups and components. When the ICDS system needs to select groups or components, the Unigraphics class selection functions is used.

As explained above, the subject ICDS has three modules generally referred to as the tube design, or creation, module, the tube editing module, and the tube detailing module. The tube design module helps a designer route a tube between tube fittings. Tube routing is accomplished using a series of points along the tube run or identifying a series of lines and arcs which define the center line of the segment. The tubing system builds and maintains the connectivity information of the tube-fitting network.

The tube editing module provides functionality to edit tube assembly geometry. The tube detailing module helps a user prepare detail drawings of tube assemblies. Using the tube network information built by the tube design module, a series of charts can be generated for tube bending and inspection operations and placed on the face of the drawing.

The following description describes each module separately. Of course, the structure of the ICDS tubing system does not necessarily have to strictly adhere to the structure set forth below, and many other structures are possible for providing the desired functionality.

Tube Creation Module

The following description relates to the functionality and one implementation of the tube creation module. This module generally obtains the required user input through a dialog with the user, defines the tube, fitting selection and placement, creates and names tube control points, checks, or inspects, the tube coordinates, generates a data file, and validates the data contained in the data file. Each of these functions is described below in detail.

A. ICDS Tubing Main Dialog

FIG. 1 shows the main create dialog of the subject ICDS. The dialog is displayed when a user executes a task named ICDS-TUBING from the UG main menu bar File=>Execute=>User function. This dialog is displayed, for example, on the top left corner of the screen, between the left end of the screen and the UG graphic window. The UG exit function under file management, blank/unblank functions under edit, view management functions, layout management functions, coordinate system manipulation functions, layer control functions, object enquiry functions, system preferences and macro functions are available to the user from the main UG menu bar when the subject ICDS is being executed.

The tide for the main dialog is ICDS-TUBING. The push button below the title allows the user to switch between the three modules of the tubing system. That is, the user may switch between the create, edit and detail modules. In the create module, the user defines tube parameters, route tube segments, place fittings, create and name tube control points, define inspection coordinate system, output data files and name a pure hose assembly. Display symbol and tube validation functions are also available under ICDS tubing create. This functionality is described below in further detail.

The cancel button at the bottom of the main dialog allows a user to exit from the system. At the time of exit, tube, fittings and connectivity information is stored in the part file as generic entities. When the user resumes a new session on the same part file, existing tube, fitting and network information is validated. If any incompatibility exists, the user is informed of the incompatibility. Incompatibility can be the result of modifications made by the user on the tube and fitting geometry using UG base functions.

B. Tube Parameter Setting

Figure 2:
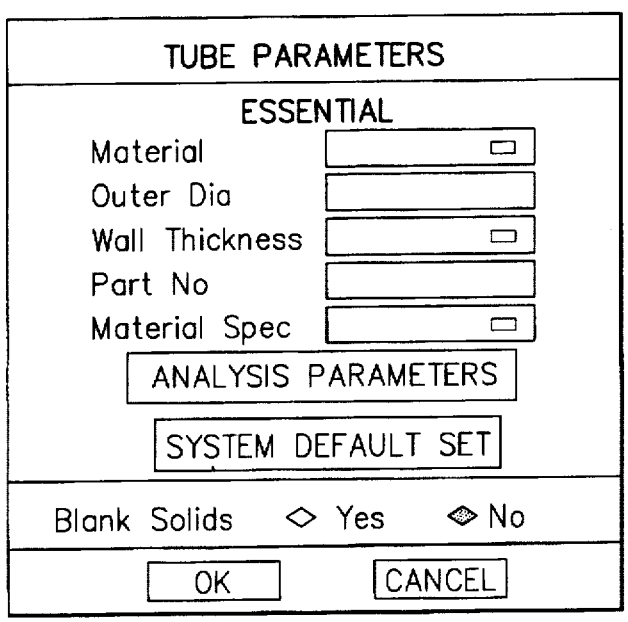
FIG. 2 is the tube parameter setting dialog.

The user sets the tube parameters using the tube parameter setting function before routing a new segment. The dialog for this function, shown in FIG. 2, is used for tube parameters definition. The tube parameter dialog is displayed when the user selects the tube parameter option from the main tubing dialog discussed above. The tube parameter definition window and the main dialog are visible on the screen, one below the other.

Tube parameters are used by the tubing system to define the geometry of a tube segment. More particularly, the system uses two sets of parameters. One set of parameters contains the default values set by a system manager and the other set of parameters contains the working set defined by the user. The system default values for parameters are kept in a separate file pointed through an environment variable ICDS_TUBE_PARAMS. The user sets this variable to point to a file in the user's directory.

The title for the dialog associated with defining the working set of parameters is 'tube parameters'. These tube parameters are divided into two categories, namely, essential and analysis parameters. Essential parameters are material, outer diameter, wall thickness, part number and material specifications. Material type, material specification and wall thickness are motif option menus. Outer diameter and part number are data entry fields. Data entered in these fields is validated, as described hereinafter. The system default set push button is used to set the working parameter set to the default parameter set. The blank solids status can be set to yes or no by the user by setting the respective toggle buttons. Valid parameter values for essential and analysis parameters are stored in ASCII files maintained by the system manager. The names, format and contents of these parameter data files can be established by the system user.

Selecting the cancel button of the essential parameter dialog causes the ICDS to return to the tubing main dialog without saving the current modification. Selecting the OK button of the essential parameter dialog causes the ICDS to return to the main dialog after saving current changes to the working set.

The analysis parameters push button is used to set the analysis parameters used by the analysis subsystem of ICDS system. The analysis parameters are stored at the inseparable assembly level. If there are more than one inseparable assemblies in the part file, when the user selects this push button, the system prompts the user to select the inseparable assembly of which the analysis parameters are to be set. After the user selects an inseparable assembly, a dialog as shown the FIG. 3 is displayed.

The analysis parameters are pressure, temperature and operating fluid. The temperature and pressure are data entry fields and the operating fluid is an option menu.

Selecting the OK button of the analysis parameter dialog causes the system to return to the tube parameter dialog after saving current analysis parameter changes to the working set. Selecting the back button of the analysis parameter dialog causes the system to return to the tube parameter dialog without saving current modifications in the analysis parameters. Selecting the cancel button of the analysis parameter dialog causes the system to return to the tubing create main dialog without saving current modification in analysis parameters.

C. Tube Definition

Upon the selection of the tube definition option from the main tubing dialog, the tube definition dialog, as shown in FIG. 4, is displayed. The title for this dialog is 'segment'. There are three methods of routing a tube segment. These routing methods are (1) using points at the tube vertices, (2) using lines and arcs along the segment center line and (3) using data from an existing tube data file in the Geometric Data Storage System (GDSS). For defining segments using centerline representation, the arcs should be tangent continuous with the adjoining lines. The tubing system creates tube segments as hollow solids for visual and automatic interference checking. Each segment consists of individual (not united) hollow straight and bend solids, centerline lines and arcs and control points. These segment entities are grouped.

The option menu below the tide of this dialog allows the user to toggle between the three methods of tube definition. The bend radius is a data entry field with a default value depending on the tube material and the outer diameter. For titanium, the minimum bend radius will be three times the tube diameter and for all the other materials, the minimum bend radius is two times the tube diameter. The minimum bend radius for hose is four times the tube diameter. The allowable minimum bend radius rule, if violated, results in a warning being generated. The user may override this rule.

Below the bend radius field, the essential tube parameters are displayed as set by the user. The tube parameters could be altered and saved using the 'update parameters' push button. The behavior of fields under tube parameters is identical to that of essential parameters in the parameter definition dialog. The minimum straight length rule for titanium tubes is four times tube diameter and for all other materials, tube times tube diameter. Violation of the minimum straight run rule results in a warning being generated. The user may override this rule.

The minimum bend radius and straight length values in terms of diameter are also defined in a material definition file. These minimum values are read from the material definition file at run time.

Selecting the OK button of the segment dialog causes processing to proceed to tube definition with the parameters set in this dialog. Selecting Back button sets the tube parameters to default values. Selecting the Cancel button of segment dialog rejects the just executed tube definition operation and causes processing to return to main tube dialog.

1. Through points

Selecting the OK button of the segment dialog, if the tube definition mode is set to through points, causes the 'segment' dialog to be replaced with the generic point selection dialog of the UG system. The cue line reads 'select a point to rout tube segment'. As the user picks points along a tube, the solid tube is created with fillet bends at the straight run joints. The minimum straight length and bend radius rules, if violated, will result in a warning being generated. If the bend is geometrically not possible, an error message is generated.

Selecting the OK button of the generic point dialog completes the definition of a tube segment. Selecting the Back button of the generic point dialog rejects the last point defined on the segment and updates the tube geometry file. This button could be used to undo straight runs successively. Selecting the Cancel button of the generic point definition dialog cancels the generic point selection and returns processing to the tube definition dialog without saving the current segment.

2. Through curves

This function allows the user to define tube segments by selecting existing center line geometry (lines and arcs only). The UG single entity selection dialog is used to select the center line geometry. As the user picks the lines and arcs, corresponding solid tube straights and bends are created. The entity selection dialog is masked for lines and arcs only. The cue line reads 'select tube center line geometry'. The minimum straight length and bend radius rules, if violated, result in a warning being generated. If the bend is geometrically not possible, an error message will be generated.

Selecting the OK button of the generic point dialog completes the definition of a tube segments. Selecting the Back button of the generic point dialog rejects the last point defined on the segment and updates the tube geometry. This button could be used to undo straight runs successively. Selecting the Cancel button of the generic point definition dialog cancels the generic point selection and returns processing to the tube definition dialog without saving the current segment.

3. Tube data file

The tube data file is the ASCII representation of an inseparable tube assembly. The tube data file consists of a header and tube point data. The header is a fixed length record with following fields: record number, part position number, tube diameter, drawing number, total number of points in the file, tube origin point number, three point numbers that define inspection coordinate system, name of the designer and tube wall thickness.

Following the header, continuing point data is represented. The point data records are fixed length records with five data fields. The first field is the record number. The next three real numbers are the point coordinates, buttress line, and waterline and station coordinates, in the engine coordinate system. These axes map onto x, y and z respectively. The last field in the continuing point data record defines the fitting or bend at that tube point.

There are a number of rules governing the code present with tube points for fitting or bend information. Particularly, if a tube bend is present at the point, the bend radius is output as a real number at this field. If a standard fitting is present at the point, an eight digit code for the fitting is present in this field as an integer. For user defined fittings, a negative real number is present. A tube run starts with an end fitting and continues through the main run. Any branches in the main run are defined after the main run in the order they are encountered in the main run.

The system routes tubes using the tube data file. When the user selects the OK button from tube definition dialog with the routing method set to tube data file, a file selection dialog is displayed for the user to select the tube data file. Once the tube data file name is selected, the tube run is created using the tube data file. The fitting information in the tube data file is used only to ascertain connectivity. Fittings are not be assembled to tubes created. The tube control points (TCPs) associated with fittings defined with negative fitting codes are created as UG point entities without TCP attributes.

D. Fitting Selection And Placement

When the user selects the fitting item from the main tube create dialog, the fitting assembly method and positioning method definition dialog as shown in FIG. 5 is displayed. This dialog has a heading 'fitting positioning' and allows the user to define the fitting assembly method and positioning method by setting the appropriate toggle buttons. There are two modes in which a fitting can be assembled to the tube assembly. These modes are referred to as the part import mode and the component assembly mode. The five mutually exclusive positioning toggle buttons allow the user to set the positioning method. The five methods of fitting positioning are explained in detail below.

Figures 6, 8:
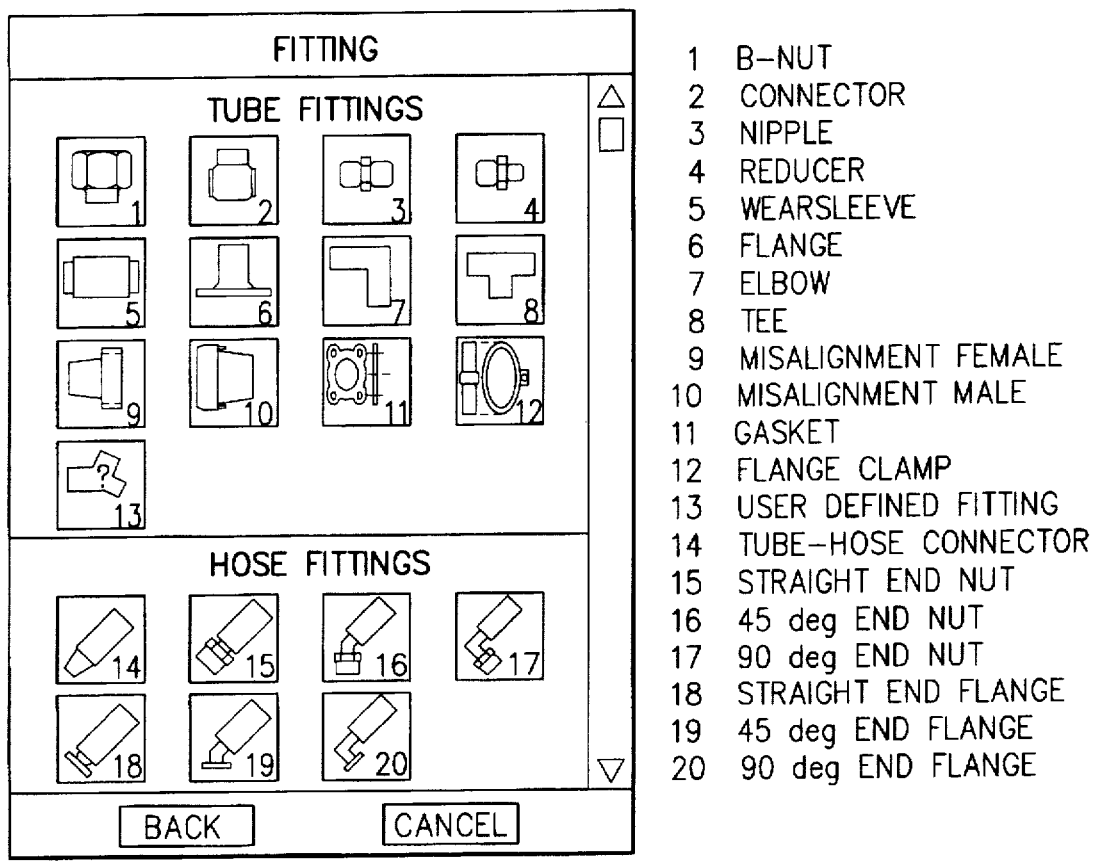
FIG. 6 is the fitting type definition dialog.
FIG. 8 is the user defined fitting definition dialog.

Selecting the OK button in the dialog causes processing to proceed to the fitting selection dialog shown in FIG. 6. Selecting the Cancel button causes processing to return to the tubing main create dialog after dismissing the fitting positioning dialog.

1. Placement methods

As mentioned above, there are five methods for placing fittings in a tube assembly. More particularly, the user can place a fitting in free position if no connectivity is to be established with the fitting. The UG generic point selection is used to define the free location for the fitting. The cue line at this stage reads 'select a location for the fitting'.

Positioning a fitting to another fitting is useful when routing a new tube assembly connected to another inseparable assembly. The user in this situation first positions a first fitting relative to a second fitting and then routes the tube run from between the fittings. The UG single entity selection dialog is used to select the connection TCP on the fitting to which the new fitting is to be connected. Point entities in the part file are masked for selection and the cue line will read 'select connecting fitting port'. When a fitting is positioned next to another fitting. the TCPs at the end of the fittings will not align one over the other. This is because of the overlap required for mating.

The user can assemble a fitting with respect an existing coordinate system. An existing save coordinate system must be stored in the part file at the correct orientation and location. The UG single entity selection dialog is used for identifying the coordinate system entity. The cue line reads 'select coordinate system to align fitting'.

A fitting can also be positioned on a segment. The fittings that can be placed on a segment are in-line fittings and tees. While positioning a fitting on a segment. the UG single entity selection menu is used. Lines, arcs and solids are masked for selection during this operation to enable the selection of a segment. The cue line reads 'select a segment to position fitting'. The fitting is positioned at the closest point on the tube centerline to the screen pick position. After the fitting is positioned on the segment. the segment is trimmed to the correct length.

The fittings can also be positioned at the end of a segment. The segment selection method is same as in the case of one segment. The cue line reads 'select a segment end to position fitting'. The tube is trimmed to the correct length after positioning the fitting.

2. Fitting type selection

Various categories of fittings can be selected for placement using an ironic selection box from the fitting type selection dialog as shown in FIG. 6. In order to allow customization of existing fitting types or the addition of new fittings, this dialog is driven by an ASCII file. The main body of the dialog can contain as many groups of fittings as defined in the ASCII file. Each group has a title and a number of icons. Each member of the group has to be defined in the ASCII file with their names, icon files and fitting category. The behavior of the fitting is defined by its category.

The default ASCII file contains two groups of fittings, namely, tube fittings and hose fittings. The tube fittings are a b-nut, connector, nipple, reducer, wear sleeve, flange, elbow, tee, female misalignment fitting, male misalignment fitting, gasket, flange clamp and user defined fitting. The hose fittings are a tube-hose connector, end nut, 45 degree nut, 90 degree nut, end flange, 45 degree flange and 90 degree flange.

Depending on the method of placement, all or some of the fitting types are available to the user for selection. All fittings other than a flange clamp and a gasket can be placed free in space. For placing a fitting to another fitting, all fitting types are available except swivel flange and wear sleeve. Only an end fitting can be placed with respect to a coordinate system. All fittings other than a flange clamp and a gasket can be placed at the end of a segment. Only a user defined fitting, tee, an in-line fitting and wear sleeve can be placed on a segment.

Selecting the Back button of this dialog allows the user to step back to the fitting positioning definition stage of the fitting placement operation. Selecting the Cancel button returns processing to the tubing main create dialog.

3. Specific fitting selection

Figure 17:
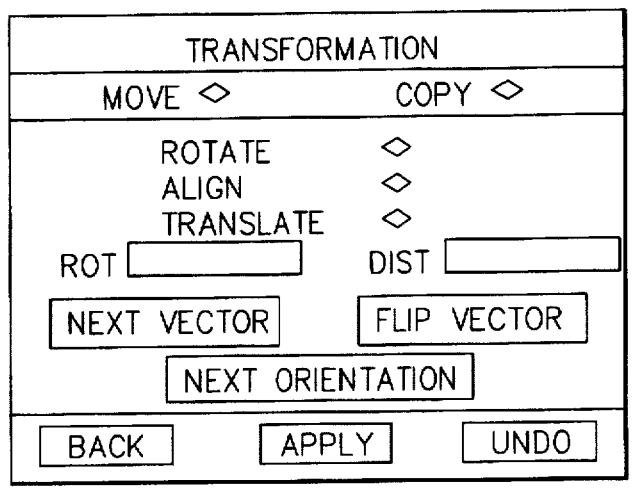
FIG. 17 is a transformation dialog.

Once the position and type of the fitting is selected, the system displays the dialog for the specific fitting selection as shown in FIG. 17. This dialog allows the selection of standard library fittings.

This dialog has four main sections. Sections 1 and 2 are used to query the fitting library for a list of suitable fittings. Sections 3 and 4 display the result of the query. Section 1, titled 'selection criteria', allows user entry of tube and fitting port dimensions for the desired fitting. These fields are defaulted to the current tube parameters or fitting placement location properties depending on the placement method chosen. If fitting placement method is 'free position' or 'to coordinate system', these fields are filled with default tube parameter values. If the placement method is on the segment or at segment end, these values are derived from the selected segment. If the placement method is fitting to fitting, the fields are filled with values from the mating fitting.

Section 2, titled 'additional criteria', allows the user to further refine the selection by specifying more detailed selection criteria. The contents of this section are driven from an ASCII file. The list of fittings matching the current selection criteria is displayed in the selection box. Once the selection criteria is established, the system parses the assembly detail files of fittings of the required type for matching criteria. Details of standard fitting library are described below. The result of the search is presented to the user in the listing box.

A single click of the mouse button on any item in the box results in the display of the fitting details in the fitting detail listing box, i.e., section 4. Selection of a fitting from the list and clicking on the OK button results in the selection of that standard fitting for placement. Selecting the back button causes processing to back up to the previous dialog. Selecting the cancel button causes processing to return to the main create dialog.

4. Selection of user defined fitting

Figure 18:
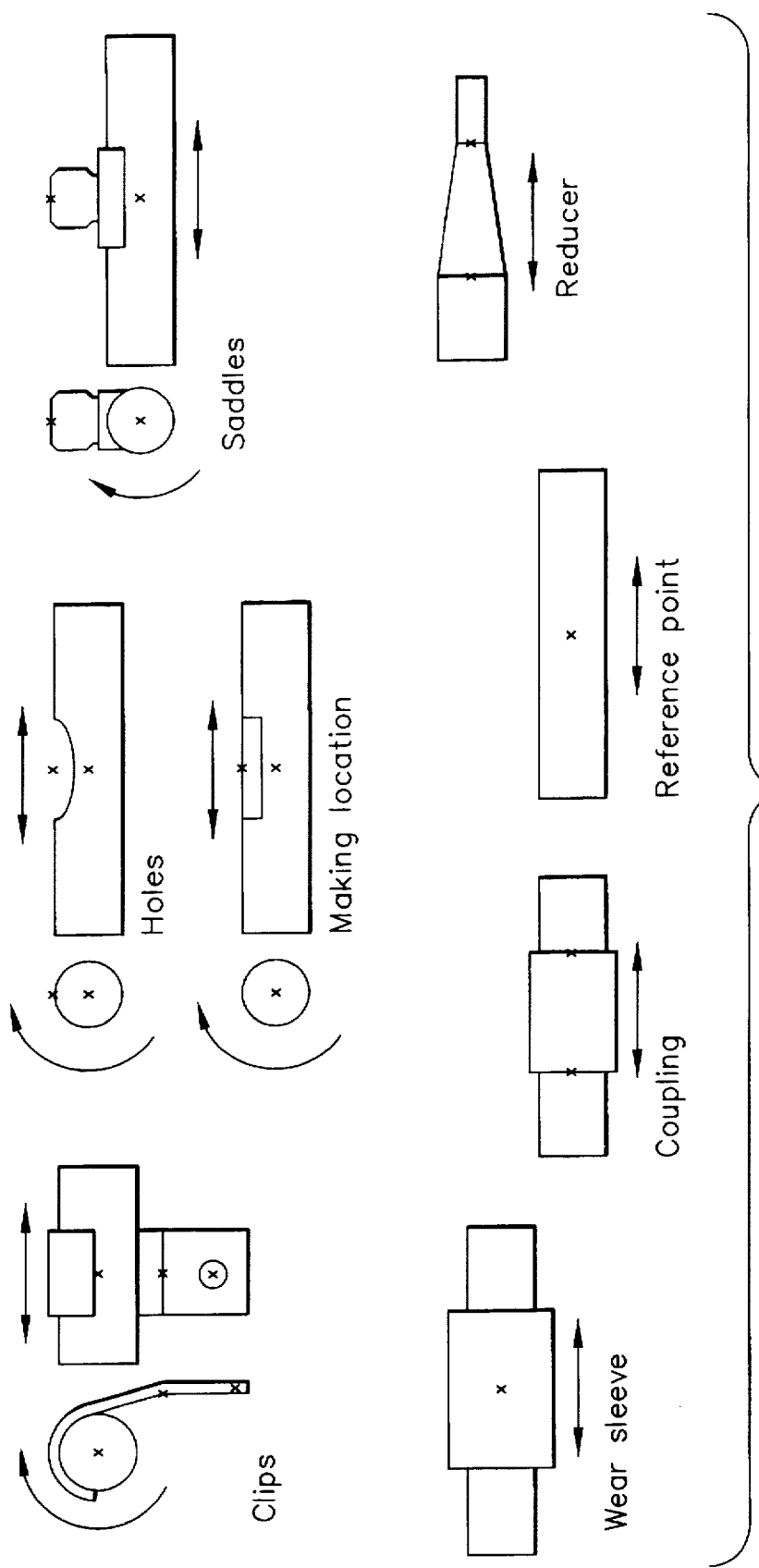
FIGS. 18, 19 and 20 are movements for various fittings.

Any fitting that is not present in the standard library is a user defined fitting. To assemble a user defined fitting to an inseparable assembly, the user has to define the solids that define the fitting with their identification and nomenclature and tube control points associated with the fitting. When the user selects the user defined fitting option from the main fitting selection menu, a dialog as shown in FIG. 18 is displayed.

This dialog is used to define the geometric entities that define a fitting. This includes the solid components and the TCP points. There are two methods in which the user can select the geometry for the fitting, namely, from a file and selecting a number of solids and points interactively. The mutually exclusive push buttons below the title of the dialog shown in FIG. 8 are used to choose the fitting geometry definition method.

If 'file name' button is selected, a motif file selection widget is displayed for file selection with the cue line reading 'select fitting part file'. The user selects the name of the file in which the fitting geometry is present. The new file is opened and displayed in the graphic window of UG for further user interaction. The system checks the number of solids in the part file to ascertain that the file opened is a fitting part file. It is required to have only the fitting geometry in the part file opened. If the part contains more than five solid bodies, it will not be considered as a fitting part.

The 'entities' option can be used to define a fitting by selecting solids and TCPs from the work part. The UG multiple selection dialog is used to select fitting geometry, with the cue line reading 'select entities for fitting'. Once the fitting components and TCPs are selected, the fitting geometry is transferred to a temporary file and this file is displayed for further definitions.

Once the geometry of the fitting is identified, the system checks for the presence of attributes defining the identification and nomenclature for each of the solid objects present in the fitting geometry. If they are present, the system proceeds to the TCP definition step. If the identification and nomenclature attributes are not present on any of the components of the fitting, the second section of the fitting definition dialog becomes active. In this section, the system displays the total number of components in the fitting. Using the 'next' and 'previous' buttons, the user can scan through the component details. Identification and nomenclature can be entered in the text fields.

Selecting the OK button completes the component definition stage. If all the components are defined completely, the system proceeds to the TCP definition stage. If any component is not defined completely, an error message is displayed. Selecting the Back button causes processing to return to the geometry definition stage. Selecting the Cancel button causes processing to return to the tubing main create dialog.

Next, the system displays an inquiry message box asking the user whether the fitting being defined is a manifold type. A manifold type fitting has more than one port direction TCP and may or may not have a bolt location TCP. The inquiry dialog is shown in FIG. 9.

Tube control points on the fitting are defined next. A dialog as shown in FIG. 10 is used for this purpose. The TCP count text field shows the count of TCP that is being defined. The type of the TCP can be set by selecting the corresponding toggle button from the TCP type radio box. After setting the correct TCP type, when the user clicks on the OK button, the UG single entity selection menu is displayed for the TCP definition. Using the single entity selection dialog, the user defines all the TCPs in a user defined fitting. Point entities are masked for selection and the cue line reads 'select point for TCP'. Selecting the Done button completes the TCP definition operation. Selecting the Back button causes all the TCPs defined to be rejected and processing returns to previous menu.

If the user is defining a fitting of the manifold type, the system prompts the user to select the port TCP and the port direction TCP in pairs. The user also has to define a locking TCP for a manifold type fitting.

5. Final fitting placement

Once the specific fitting and its location are defined as set forth above, processing proceeds to the fitting edit mode, which is described below. Functionality in the fitting edit allows the user to fine tune the fitting placement.

6. Connectivity and tube control points

In order to allow editing of fittings and segments, and bend table generation, the connectivity information between fittings and segments must be maintained. Tube control points are used for this purpose. Each tube assembly in a part file contains data structures in the form of generic entities which define the association between segments and fittings. There are two main categories of TCPs, namely, connection type and orientation type. Connection type TCPs are used to establish connectivity between segment ends to fittings and fittings to fittings. Orientation TCPs are used to establish orientation of fittings in the tube assembly. The two TCP categories are discussed below.

Connection TCPs

Male fitting port: A 'male fitting' TCP is associated with a fitting that has one of its ports as a nipple. This type of TCP can belong to nipple, tee, saddle and wye. A 'male fitting' TCP in an end fitting is toleranced in all three directions in the coordinates-intersecting-end points table. If it belongs to any other type of fitting, it appears as a toleranced point in the coordinates-intersecting-end points table.

Female fitting port: A 'female fitting' TCP is associated with fittings of the types b-nut, saddle, elbow, tee and wye. If this type of TCP is present on an end fitting, that point is toleranced in all three directions in the coordinates-intersecting-end points table. If this TCP is present on in-line fittings, it is present in the coordinates-intersecting-end points table as a toleranced point.

Tube fitting port: A 'tube fitting joint' TCP is the point at which a tube is welded or brazed to a fitting of the class other than surface mounted fittings. These points are not present in the coordinates-intersecting-end points table except in the case of in line connectors.

Flange male port: A 'flange male port' TCP is the point on a male type flange mates to a female type flange. This point is an end point in an assembly and toleranced an all three directions.

Flange female port: A 'flange female port' TCP is the point on a female type flange which mates to a male type flange. This point is an end point in an assembly and is toleranced an all three directions.

Swivel flange port: A 'flange joint' TCP is associated with a flange and defines the point of the flange at which another flange mates. These TCPs are present in the coordinates-intersecting-end points table as a reference point.

Misalignment female port: A 'misalignment female port' TCP is the point on a female type misalignment fitting which mates to a male type misalignment fitting. This point is an end point in an assembly and toleranced an all three directions.

Misalignment male port: A 'misalignment male port' TCP is the point on a male type misalignment fitting mates to a female type misalignment fitting. This point is an end point in an assembly and is toleranced an all three directions.

Hose-fitting port: A 'hose-fitting joint' is the point at which a hose is connected to a hose fitting. This point is not present in the coordinates-intersecting-end points table.

Tube vertex: A 'tube vertex' TCP is associated with a tube and is the point at which a bend is present. It is also called as an intersecting point because the tube venter lines of two adjacent straight runs intersect at this point. These points are present in the coordinates-intersecting-end points table as basic points.

Port direction: A 'port direction' TCP is associated with multi port fittings, wye, tee, elbow and manifolds. These TCPs define the direction of flow on each port of the fitting. These TCPs are present in the coordinates-intersecting-end points table as basic points.

Gasket face: A 'gasket face' TCP belongs to a gasket and defines the direction in which a gasket mates with a fitting. This point does not appear in the charts.

Orientation TCPs

On tube center line: An 'on the tube center line' TCP is associated with some fittings. Fittings that have this type of TCP are clips, wear sleeve, saddle, hole and marking location. This type of TCP appears in the coordinates-intersecting-end points table in the tube drawing as a reference point.

Off tube center line: An 'off tube center line TCP' is associated with some fittings. Fitting types that contain this TCP type are clips, hole and marking location. This type of TCP appears in the coordinates-intersecting-end points table in the tube drawing as a toleranced point.

Clocking: 'clocking' TCPs are associated with bolted flanges and bolted manifolds. This TCP is used to lock the position of the fitting in space. These TCPs are toleranced points in the coordinates-intersecting-end points table.

E. TCP Creation

The TCP creation routine allows the user to define new segment vertices for segment editing, tube reference points for special fitting locations (for example, snap on wearsleeve) and locator point pairs for marking locations and holes. Upon the selection of the TCP create option from the main tube dialog, the UG single entity selection dialog is displayed to allow the user to select the segment on which the TCPs will be created. Next the create TCP dialog shown in FIG. 11 is displayed with the segment name in the segment text field.

Subsequently, the user selects one of the three mutually exclusive TCP types by setting its toggle button on. When the user clicks on OK, the generic point selection dialog will be displayed for the user to select a location for creating a TCP. The TCP is created on the segment center line normal to this location. If the TCP type is locator, an additional TCP is created on the surface of the tube and the fitting transformation dialog, discussed below, will be provided to allow the user to clock the TCP pair.

Selecting the Back button of generic point dialog causes the last TCP created in this TCP creation operation to be deleted. Selecting the OK button of generic point dialog causes a TCP to be created at the current position. Selecting the cancel button of generic point dialog returns processing to the TCP creation dialog. Selecting the Cancel button on the TCP creation dialog returns processing to the main tube create dialog and clicking on the OK button on the TCP creation dialog causes processing to proceed with TCP creation.

F. TCP Naming

All TCPs are named to present them in the inseparable assembly drawing and charts. A main tubing dialog item allows the user to name the TCPs in a part file. Upon the selection of this option, the TCP name creation dialog as shown in FIG. 12 is displayed.

If the automatic naming option is selected, the Unigraphics single entity selection dialog with mask set to points only will be displayed and the user will select the start TCP. The cue line reads 'select start TCP'. The system then traverses the TCP network from the start point, naming all TCPs as they are encountered. The TCP names are alphabetic using the following increasing sequence.

[A,B, . . . ,Z,AA,AB,AC, . . . ]excluding [I,O,Q,X,Y,Z]

When a branch is encountered, the system traverses the segment having the most number of TCPs first. If the 'unnamed only' button is set, only the TCPs without names are named.

If manual naming is opted, the single entity selection menu with mask set to points is displayed. The cue line reads 'select TCP to name'. After the point is selected, the create TCP name dialog is displayed to allow the user to enter the TCP name in the text field. Selecting the OK button causes the name to be assigned. Selecting the Cancel button causes processing to return to the main tubing create dialog.

G. Inspection Coordinate System Definition

The inspection coordinate system (ICS) is the coordinate system about which all the points in a tube assembly are presented in the tables for manufacturing and inspection. The origin of the ICS is at the start TCP point. When the user selects the inspection coordinate system definition option from the main tubing create dialog, the ICS definition dialog as shown in FIG. 13 is displayed. There are two methods of defining the inspection coordinate system, namely, manual and automatic. The methods are selected by setting the corresponding toggle button.

If the ICS creation method is set to automatic, the system computes the flattest coordinate system possible for the tube assembly by computing the distances of vertices from a plane defined by any three segment vertices in the tube assembly. The three point combination that gives the minimum cumulative distances of all other points defines the XY plane of the ICS. A coordinate system entity is defined with this plane as the KY plane and with the origin at tube start point.

If the user has set the definition method to manual, the system will prompts the user to define a coordinate system as ICS, using the UG coordinate system definition function. Once the ICS is defined by the user, the system creates a coordinate system entity at the tube origin. The new coordinate system entity is named 'ICS'

Selecting the OK button causes processing to proceed with the ICS definition. Selecting the cancel button will cause processing to return to the main tubing create dialog.

H. Data File Generation

The data file generation function allows the user to generate the data files using the data files dialog as shown in FIG. 14. There are two options for the output device for data file generation, namely, listing device and file. The default is set to listing device. If the output device is set to listing device, the text field for the file name entry will be insensitive. If the output device is set to file, the file name field will become sensitive and user can enter the file name. The mutually exclusive toggle buttons for the file type defines the type of listing device.

Four files are generated from a tube definition. These files are the parts list file, a transaction file, a center of gravity file and a transformed tube coordinate data file. These data files are generated by the system only if the working part file contains one inseparable tube assembly. By clicking on the edit parts list button, the user may remove items from parts list. When the user selects this button, the system prompts the user to select the component that is to be removed. Once the user selects the component to be removed, the system highlights the component and prompts the user to confirm the selection. After the user confirms, the component is removed from the parts list. Selecting the OK button causes generation of the data files and selecting the Back button causes processing to return to main tubing creation menu.

1. Parts list

The parts list, or the engineering parts list, is a file which contains the details of the components in an inseparable tube assembly. The engineering parts list displays the drawing number in its heading and has, for example, seven columns which are respectively designated as item number, drawing zone, drawing sheet, identification, nomenclature, CAGE number and number of items in the assembly. The system uses the UG parts list functionality to build the engineering parts list. The fields in the data records are driven from an ASCII file.

The default file contains all the fields shown in the parts list. The fields that will be filled by the system are item number, identification, nomenclature, CAGE number and number of components used. Drawing sheet and zone data are not filled by the system.

2. Transaction file

The transaction file is a fixed format transaction file to input the tube assembly details into a product data management system (PDMS). There are three types of records in the transaction file. They are record type 10, record type 20, and record type 30. The contents of these records are as follows.

| Record type 10: | column 1–2 | — | 10 |
| --- | --- | --- | --- |
| | column 3 | — | G |
| | column 4–21 | — | drawing number |
| | column 22–55 | — | drawing title |
| Record type 20: | column 1–2 | — | 20 |
| | column 3–12 | — | item number |
| | column 13–15 | — | drawing zone |
| | column 16–23 | — | drawing sheet |
| | column 24–41 | — | identification |
| number | column 42–56 | — | nomenclature |
| | column 67 | — | list code |
| | column 58–62 | — | CAGE number |
| Record type 30: | column 1–2 | — | 30 |
| | column 3–11 | — | assembly number |
| | column 12–14 | — | quantity (right justified) |

3. Center of gravity file

The center of gravity file contains the center of gravity of each run of tube segment. For each run of tube segment, the weight of the segment will also be present in this file. The center of gravity location in the table are in the engine coordinate system. Each run of tube is named after the starting and ending TCP of the tube segment.

4. Transformed tube coordinate data file

The transformed tube coordinate data file lists the same points as in the tube data file. The last field in the point records is the fitting or bend data. If a fitting is present at the point, an eight digit fitting code or the part number of the fitting is present in this field. The bend radius is output to this field at vertices.

5. Hose part number lookup

When the user selects this option from the main create dialog, the system prompts a hose assembly designation. Particular, the system checks the end fitting configuration and displays the fitting part numbers, hose length, diameter, material and hose assembly part number by querying a hose configuration table.

J. Display Symbols

The display symbol and tube validation push buttons are available under create and edit dialogs. The display symbol function highlights tube control points with symbols, e.g., diamond markers at the segment bend points and rectangular markers at the segment ends which are not connected to fittings. These symbols are displayed using temporary graphics which are removed when the display is refreshed.

K. Validation

The tube validation function checks material compatibility, minimum straight length and minimum bend radius rules. Display of the error or warning messages during tube validation will use a dialog as shown in FIG. 15.

The material compatibility check is between tubes and fittings. Particularly, any mating parts should be made of the same material. The minimum straight length and bend radius rules are governed by the tube material. A table which gives the minimum straight length and bend radius based on material type is maintained in an ASCII file by system manager. Tube validation functions use this file. The validation function also highlights all the non standard fittings used in the assembly.

The validation dialog with a heading 'validation', has a scrolled text widget to display error/warning messages. Errors are displayed in the text widget one at a time. There are three push buttons in this dialog. Using the previous and next buttons, the user can scan through all the messages generated during the current validation. The previous button causes the previous error/warning message to be displayed and the next button causes the next error/warning to be displayed.

The fittings or segments associated with any displayed message are highlighted by changing their color. Back button is used to exit from the validation message display mode.

20 Editing Module

The tube editing module provides functionality to edit tube assembly geometry. Each of the tube editing functions is described below in detail.

A. Editing Main Dialog

Figure 16:
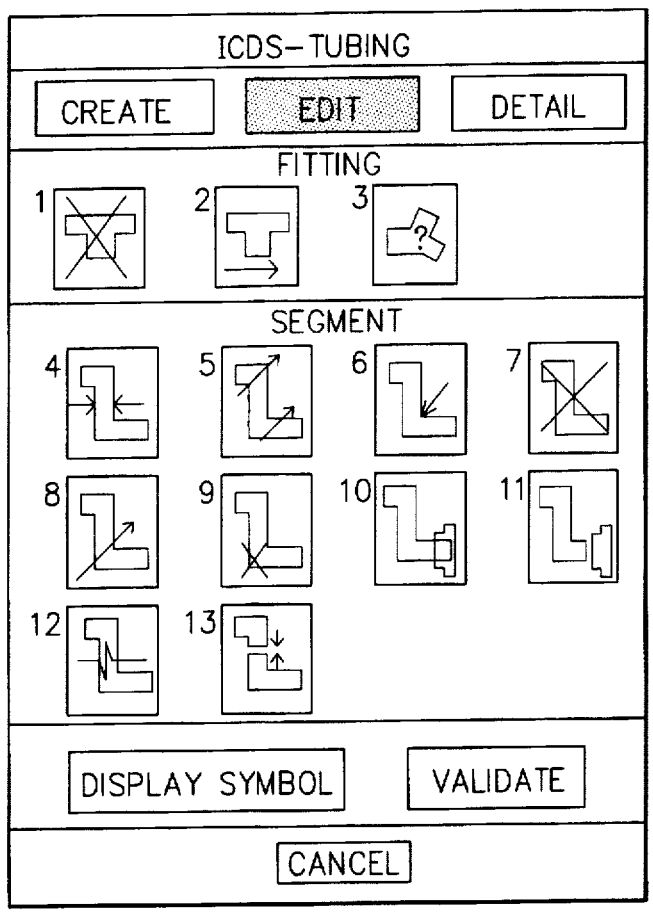
FIG. 16 is an editing main dialog.

The edit functions of the system are provided from the dialog as shown in FIG. 16. There are two sections in this dialog, namely, edit fitting and edit segment. Under edit fitting, functions are available for deleting fittings, transforming fittings and for editing user defined fitting component data. Under the edit segment, functions are available for editing tube parameters, moving segments, editing bend radius, deleting segment, moving vertex, deleting vertex, connecting tube to fitting, disconnecting tube or fitting from fitting, splitting segment, and concatenating segments. The display symbol and tube validation functions are also available under edit dialog. These functionalities are explained in below. Selecting the Cancel button causes processing to exit from the ICDS tubing system.

B. Delete Fitting

This option allows the user to delete a fitting from a tube assembly. Deleting a fitting results in removal of all solid components and TCPs associated with it. Deletion of a fitting also results in the restoration of the tubes connected to the fitting to their original positions by removing setbacks.

When the user selects this option from the edit dialog, the UG single entity selection dialog is displayed on the screen with the cue line reading, 'selectfitting to delete'.

C. Move Fitting

The transformation function is used to translate, rotate and align a fitting to another fitting or tube. The system retains the existing connectivity between the fittings and tubes during the transformation. When the user selects the transform fitting option from edit dialog, the system prompts the user to select a fitting using the UG single selection dialog. Next, the transformation dialog as shown in FIG. 17 is displayed.

The toggle buttons labelled translate, rotate and align define the type of transformation. Move and copy buttons define the mode of the transformation. While translating or rotating a fitting in the move mode, depending on the movement freedom of the fitting, the vector of transformation is displayed by an arrow on the screen. If more than one directions are available, the user can switch between these vectors using 'next vector' push button. The 'flip vector' push button is used to reverse the direction of the transformation vector. The rotation and translation text fields are data entry fields. The next orientation button is used while positioning fittings from the standard library. If there are more than one port with the same diameters, this button is used to select the correct position from these options.

Undo button on the transformation dialog rejects the last transformation. Apply button applies the transformation and remains in the transformation mode. Back button exits the transformation mode after updating the tube geometry due to the edit operation.

Figure 19:
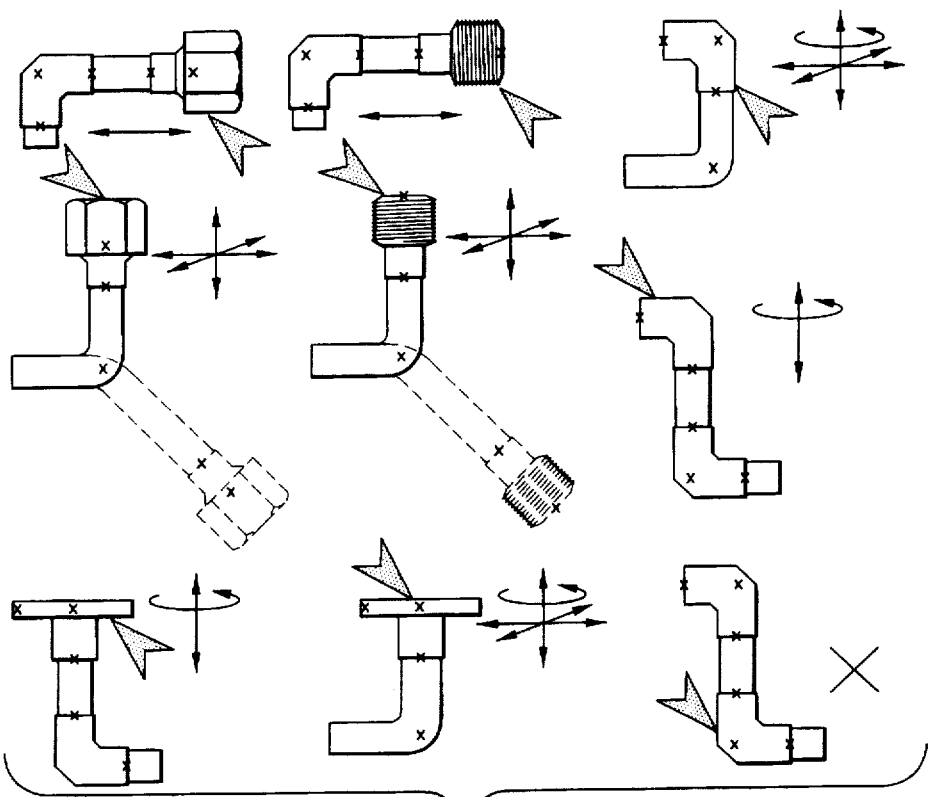
Figure 20:
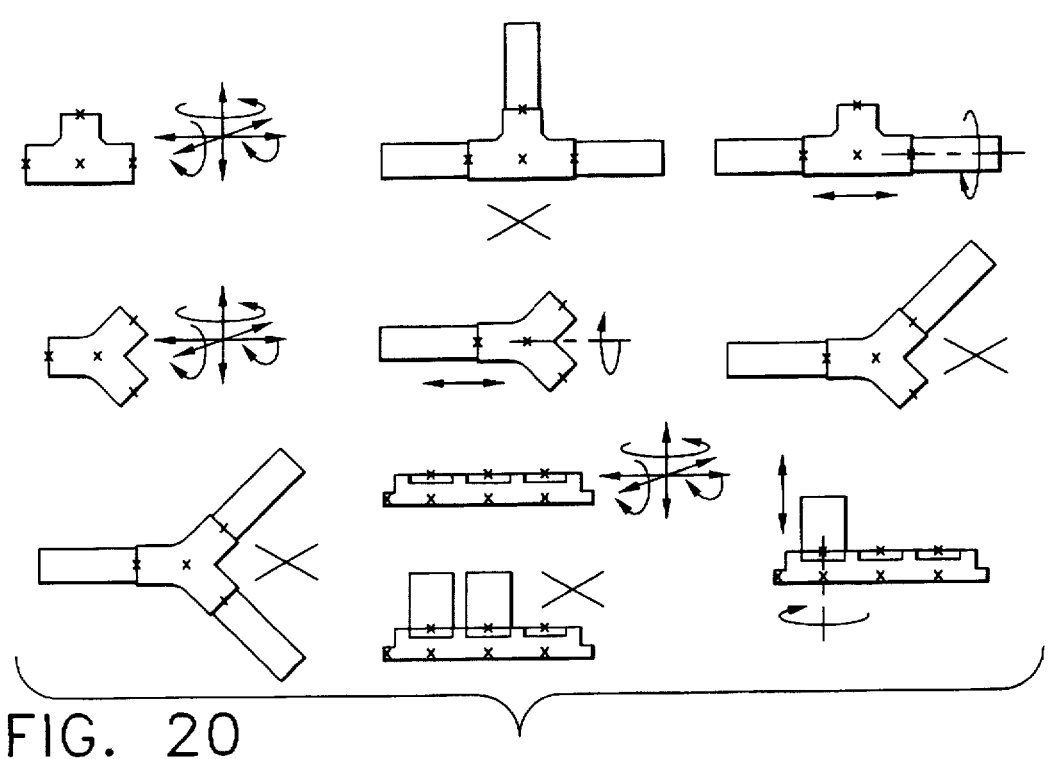

The three operations, i.e., translate, rotate and align operations, are discussed below in more detail. FIGS. 18, 19 and 20 show the movements possible for different fittings.

1. Translate fitting

If the translation toggle is set in the transformation dialog, the system displays the first available translation vector in the graphic window using a cone head. The cue line reads 'enter translation distance'. The user enters the translation distance in the text field and presses the Apply or OK button. The fitting is then moved to the new location. The system checks the design conformance rules and issues a warning if a rule is violated. The copy button is only available under translation. If depressed, the system copies the fitting at the new location. The newly copied fitting is not connected to a segment or fitting.

2. Rotate fitting

If the rotate toggle is set, the system displays the first available rotation vector using a cone head. The cue line reads 'enter rotation angle'. The user enters the rotation angle in the text field and presses Apply or OK button. The fitting is then rotated to the new position.

3. Align fitting

The align option is used to orient and connect a fitting to a tube or another fitting. The user is prompted to select the reference and destination TCPs using single entity selection dialog of Unigraphics. Points are masked for selection. The system transforms the fitting using the fitting movement rules shown in FIGS. 18, 19 and 20 to achieve the alignment. The reference TCP is connected to the destination TCP. If the transformation required to align the fitting violates the fitting movement rules, an error will be generated and no action performed.

4. Edit fitting component data

This option allows the user to edit the nomenclature and identification data on the components of a user defined fitting using the dialog shown in FIG. 21. This operation is similar to the component data definition stage of user defined fittings.

5. Edit tube parameters

This option is used to change tube diameter, wall thickness, tube material and other parameters associated with a tube. The system prompts the user to select a tube segment to change parameters using the single entity select dialog of UG. Once the user identifies the segment, the tube parameter definition dialog, as shown in FIG. 2, is displayed with the fields filled with the parameters of the segment. If the segment is connected to a fitting, the material, diameter and wall thickness fields are insensitive. After the user enters the new parameters, the segment geometry is updated including any locator TCPs.

6. Transform segment

The transform segment option is used to rotate and translate a tube assembly. The system prompts the user to select a tube assembly to be copied or moved. Once the user selects the assembly, the transformation dialog comes upon the screen as shown in FIG. 17. The align option is not be available under the transform segment unction. The user has the option to move or copy. The transformation is with respect to the WCS. The transformation values are entered in rotation or distance fields.

7. Edit bend radius

The edit bend function allows the user to change the bend radius at a vertex as shown in FIG. 22. The system prompts the user to select the vertex at the bend to be edited using the single entity select dialog of UG. Once the bend is identified, the system displays a dialog as shown in FIG. 23.

The cue line reads 'enter new bend radius'. The minimum and maximum allowable radii are displayed in the dialog. The user enters the desired bend radius in the text field. The system validates the bend radius entered. Selecting OK completes the edit bend operation and updates the tube geometry. Selecting Back rejects the last change and selecting Cancel returns to the main edit dialog.

8. Delete segment

This option allows the user to delete a tube segment from an inseparable assembly. Deletion of a segment results in the deletion of all TCPs associated with that segment. The fittings are not be deleted along with the segment. All centerline entities associated with that tube segment also are deleted. The system prompts the user to select a segment to be deleted and the UG single entity select dialog is used to identify tube segment.

9. Move vertex

This option allows the user to move a segment vertex (bend point) as shown in FIG. 24. A segment vertex can only be moved if there is a bend or tube end immediately upstream or down stream of the selected vertex. The system prompts the user to select a vertex using the single entity selection dialog of UG. Next, the system prompts the user to identify the new position for the vertex using the generic point definition dialog. The geometry of the segment is updated once the user selects the new location.

The generic point dialog remains displayed as long as the user keeps selecting points. Each time a point is selected, the vertex is moved to the new position. Selecting Back of the generic point selection menu removes the latest change. Selecting cancel restores the original tube segment and processing returns to the main editing menu. Selecting OK saves the modification on the tube and processing returns to the main editing dialog.

10. Delete vertex

This option allows the user to delete a segment vertex (bend and end points). A vertex could be deleted if its two adjacent TCPs are vertices. Deleting a vertex results in removal of the bend at that vertex and the two straight lengths attached to the bend. The tube is regenerated connecting the two vertices on either side of the vertex deleted. The system prompts the user to select a vertex to be deleted using the single entity select function of Unigraphics. After the deletion of vertex, a dialog box is displayed which provides the user an opportunity to undo or accept the edit.

11. Connect segment

This option allows the user to connect an unconnected segment end to an unconnected fitting port. The system first prompts the user to select the segment end point that is to be connected. Next, the fitting port to which the tube end is to be connected is selected. Subsequently, the system checks the compatibility between the fitting and the segment, and the connection is established, if compatible. If they are incompatible, an error message is generated describing incompatibility.

12. Disconnect segment

The disconnect option is used to disconnect a segment from a fitting. The system prompts the user to select a TCP at the junction of a segment and a fitting. The segment geometry is not altered as a result of this operation. Only the connectivity information is removed.

13. Split segment

This option is used to divide a tube segment to two at a given TCP. The system prompts the user to select a segment vertex to split the segment. The UG single entity selection function is used for selecting the TCP. The segment is split to two at the TCP selected.

14. Concatenate segments

This option allows the user to join two tube segments into a single segment. When the user selects this option, the user is prompted to select two segments to be joined using the single entity selection dialog of UG. Next, the system checks for collinear end center lines in both the segments. Whichever ends pass the collinear check are connected together. If the system fails to find a pair of collinear end center lines in the two segments, the end points closest screen pick locations during entity selection are connected with a new straight length.

Detailing Module

Figure 25:
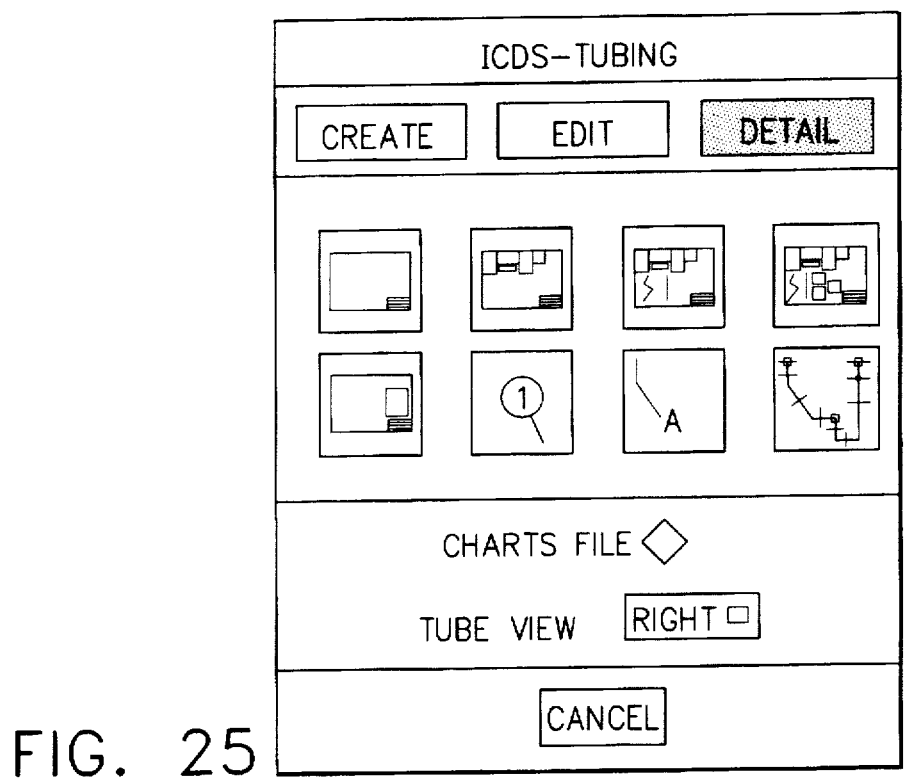
FIG. 25 illustrates the detailing module main dialog.

The third module of the ICDS tubing system is the tube detailing module. The detailing module aids the user in creating tube drawings. The main elements of a tube drawing are the drawing format, tube main views, fitting detail views, manufacturing and inspection charts and notes. The detailing module contains a number of functions which automate the creation of these elements. The user can enter the detailing module by selecting the detailing push button on the main dialog. Once set to detailing, the main dialog modifies itself to a dialog as shown in FIG. 25.

Under the detailing dialog, the user has eight dialog functions. These functions are drawing format and annotation, table generation and placement in the drawing, fitting view placement, tube view placement, notes generation and placement, item balloon placement, TCP name placement and template generation. In addition to these dialog items, there are second tube view settings and a charts hard copy output switch.

The detailing functions require a single completely defined tube inseparable assembly in the part file. The following conditions must be met to proceed to the detailing module.

(a) Single inseparable assembly in the part file, (b) All TCPs named, and (c) Inspection coordinate system defined.

If these conditions are not met, a warning is displayed and all detailing options are insensitive.

In an effort to ensure consistency between the tube model and detail drawing, the system checks consistency at entry to detailing module, entry to the ICDS tubing system and exit from the tubing system. If an inconsistency is found as a result of an edit operation, the tube main view, fitting detail views and charts are deleted from the drawing. The user is responsible for recreating the tube views, fitting views and charts. Selecting Cancel exits the tubing system.

Each detailing function is described below in more detail.

A. Drawing Format And Annotation

This function allows the user to enter global part and drawing information and automatically select, place and annotate drawing formats. Multiple drawing sheets are supported. Required information is provided by the user in a motif dialog window. The output of this module is a fully annotated drawing format.

Figure 26:
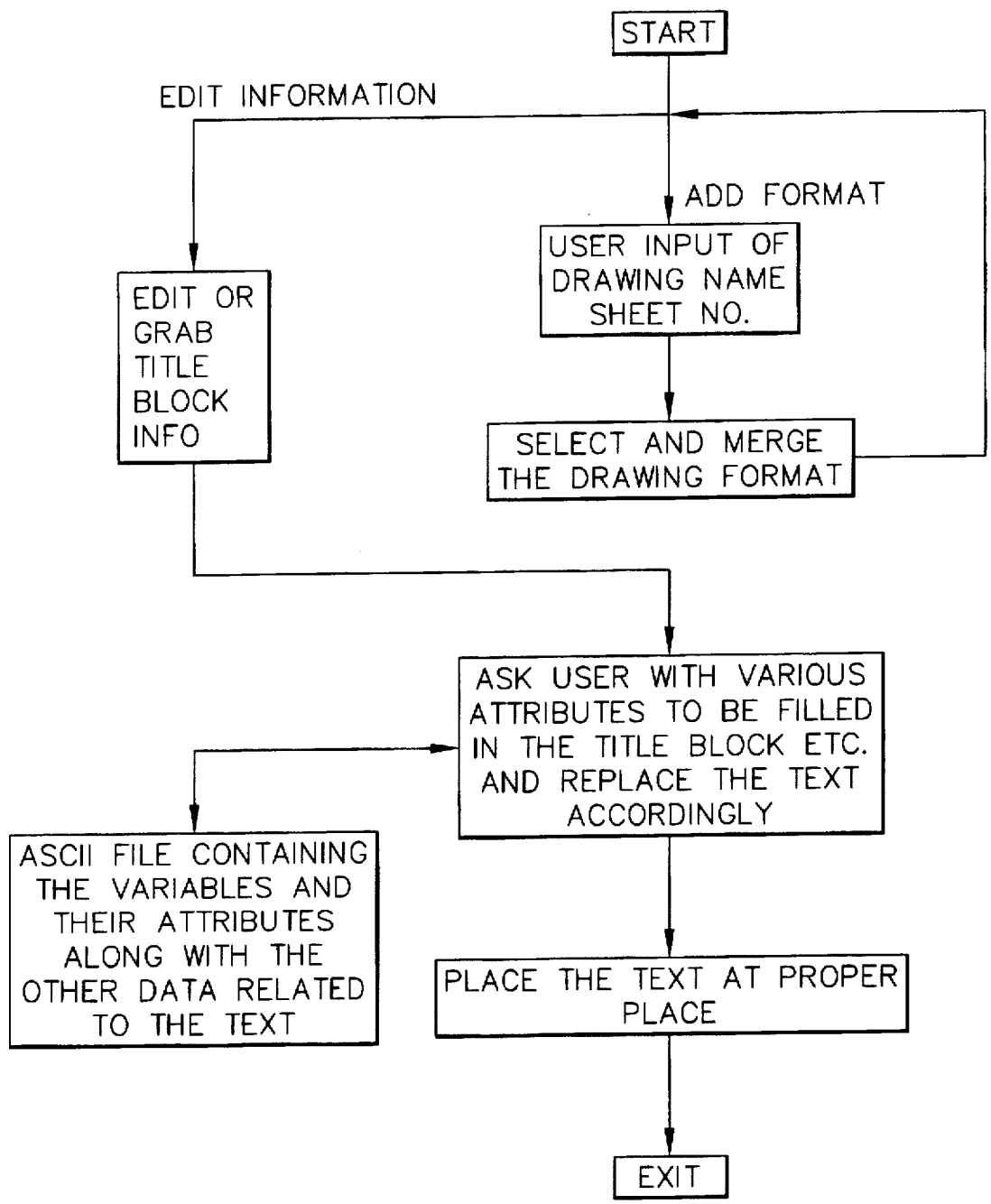
FIG. 26 is a flow chart illustrating process steps executed for drawing format and annotations.

A flow chart illustrating a sequence of process steps for the drawing format and title block annotation module is shown in FIG. 26. The module has the following options: Edit Information, Add format and Exit. In the Edit Information mode, the system gathers the global information from the user. The following are examples of global data that is captured from the user:

Drawing Title

Contract# DR#

SIN (significant item number)

ENG family

Drawing Number

Similar to (similar to which part; i.e.,when modified from an earlier part)

Station (Location w.r.t. engine)

Distribution Code (distribution list)

File Location (the place where the file is stored)

Signature Names

Interface Block (signatures of internal groups)

Customer Interface (signatures of external groups)

Layout

In the Edit Information mode, a motif dialog box is displayed which prompts the user to enter the data. The prompts and data entry fields of the motif dialog box are constructed at run time based on the contents of a menu definition file called "drawing__annotation__menu.dat" available in the directory "dwg__formats". The data entry fields are filled with values of part attributes from previous runs of this function. The menu has the typical "ok", "apply" and "cancel" buttons at the bottom. When the user selects ok or apply, the part attributes specified in the menu definition file are created or updated with the values captured from the user and all drawing formats, if present, are annotated as described in connection with the Add Format mode. Selecting OK brings the user back to the previous menu while selecting apply leaves the dialog box in place for further user data entry. By selecting Cancel, processing exits back to the previous menu without creating or updating any attribute data.

In the Add Format mode, a motif dialog box is displayed which prompts the user to enter: 1) the UG drawing name and 2) the desired sheet number. The sheet number defaults to the next available sheet number. For example, if no formats are present in the part, then the sheet number would be "1". If two formats are present in the part, then the sheet number would be "3".

Next, the part attribute "icds__drawing__size" is read to get the drawing size, and then the corresponding UG format part from the dwg__formats directory is merged. The format part files contain text entities in the correct locations on the format. These text entities are initially be set to the "#" character. Each of these text entities has an entity attribute which matches the corresponding part attribute created in the Edit Information mode.

Processing cycles the database for all text entities which have these attributes and edits the text to match the value in the part attribute. Each format and its text is grouped.

B. Charts Generation And Placement

Using this functionality, the user can generate charts required for manufacturing and inspection. If required, the user can output these tables into an ASCII file by setting charts hard copy toggle on, in the detailing main dialog. After table generation, the system places the charts at the top left corner of the drawing. All the coordinate values are present to fourth decimal place accuracy.

There are five tables used to define the geometry of an inseparable tube assembly. The tables are the coordinate-intersecting-end points table, bend data table, tube detail table, inspection data table and fabricated turn table angle. For tube hose assemblies, an approved source control table will also be present in the drawing.

The dimensions with which a tube is detailed are base angle, true angle, straight length, bend radius, arc length at bend and turn table angle. The definitions of these dimensions are as follows.

Base angle: Base angle is defined as the angle between the x-axis of the inspection coordinate system and the intersection of the perpendicular plain to XY plane, containing the straight length portion of the tube at a vertex and XY plane.

True angle: True angle is the angle between the straight run of tube measured in a plane containing this run of tube and perpendicular to XY plane, and the intersection of this plane with XY plane.

Straight length: Straight length is the length of tube from an end point to a tangent point of an adjacent bend or the length between the points of tangency of two adjacent bends.

Bend angle: The bend angle at a tube bend is defined as the angle between the perpendiculars from the center of the bend radius to the centerlines of two adjacent straight lengths at the bend.

Arc length at a bend: Arc length at a bend is defined as the length of the centerline of the tube around a bend between tangent points.

Turntable angle: Turntable angle is defined as the angle between the planes established by (a) two adjacent tube bends, (b) a tube bend and an adjacent elbow, tee or saddle fitting, and (c) two adjacent tees, saddles or elbows. The planes intersect in a straight line that is coincident with the centerlines of the straight length common to both angles. The turntable angle is given when looking down this straight line toward the previous bend or angle and is measured in a counterclockwise direction from the plane of the previous bend angle.

1. Coordinates-intersecting-end points table

This table is used to define the tube segment geometry and fitting positions in an inseparable assembly. Point A is always the start point of the tube assembly. The origin of the inspection coordinate system is point A. The point coordinates in this table are in inspection coordinate system.

The table lists vertex, male, female, on center line, off centerline and first tube fitting joint in the case of reducer. TCPs in this table. Tube-fitting joint TCPs are not listed in this table. The following rules apply for tolerancing (a) All tube segment intersection points have BSC suffix.

(b) All the end points other than A will have +—0.06 tolerance in x,y and z coordinate.

(c) Clips and saddle TCPs on tube segment are reference points without tolerance.

(d) Clip and saddle TCP off the segment will have tolerance to allow rotation about the tube center line in two coordinates.

(e) Wear sleeve TCP is toleranced along segment length.

(f) For any toleranced point, if no tolerance is present on a coordinate, that coordinate will have reference suffix.

2. Bend data table

Each record in the bend data table presents the bend data at a vertex. The record contains the following fields: the length of the previous straight run, turntable angle with respect to the previous vertex, the vertex name, bend angle bend radius and arc length. At the end of a tube run, the total developed length of the segment is listed.

3. Tube detail table

The tube detail table presents the item number, material specification, diameter, wall thickness and tube run name of each run of tube in an assembly. Tube segments are identified by item number and run of tube.

4. Inspection data table

The inspection data table is used to inspect an inseparable assembly after fabrication. This table is also used to manufacture the inspection fixtures for the assembly. The table contains point coordinate data, base angle and true angle of the following points:

(a) All free end TCPs of fittings and tubes (b) All segment end TCPs (Set back TCPs)

(c) The mid points of all straight runs which have one bend on either side.

(d) All on tube center line TCPs associated with wearsleeves.

(e) All off tube center line TCPs.

(f) All bolt location TCPs (locking point TCPS)

5. Fabricated turntable angles table

Fabricated turntable angles are used to establish the orientation of specific types of fittings relative to the segments connected to them. The following rules apply while generating this table:

(a) This table will be present in the drawing only if one or more of the fitting of the following types of fitting is present in the assembly: saddle, tee, wye, manifold.

Figure 27:
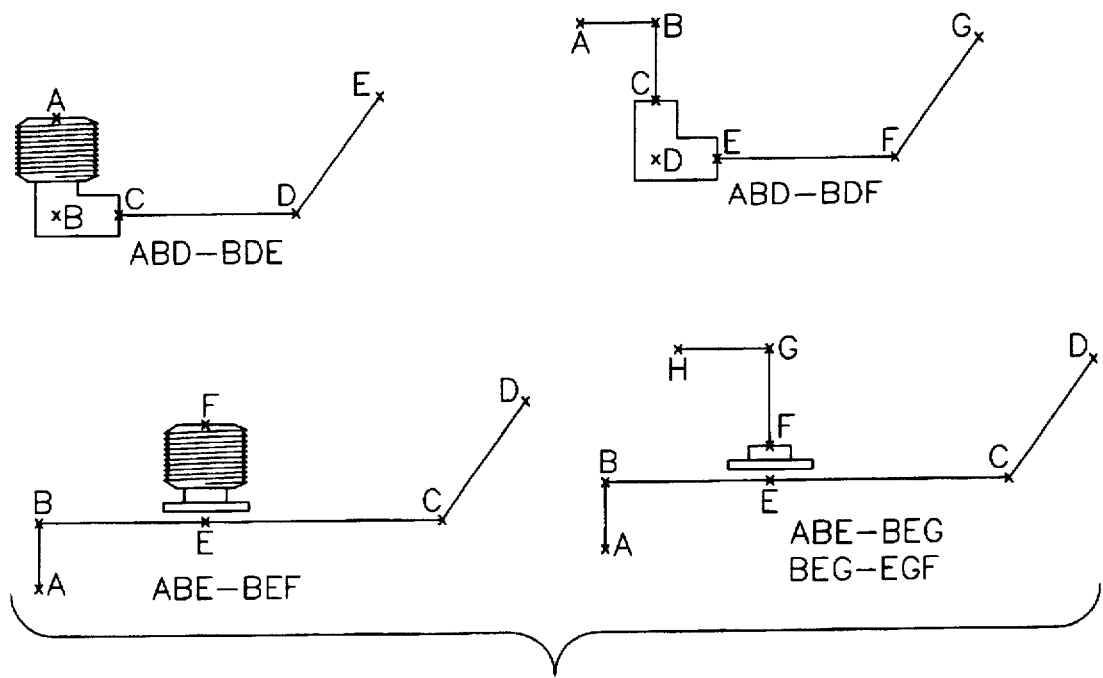
FIGS. 27 and 28 illustrate the angles for different types of fittings.
Figure 28:
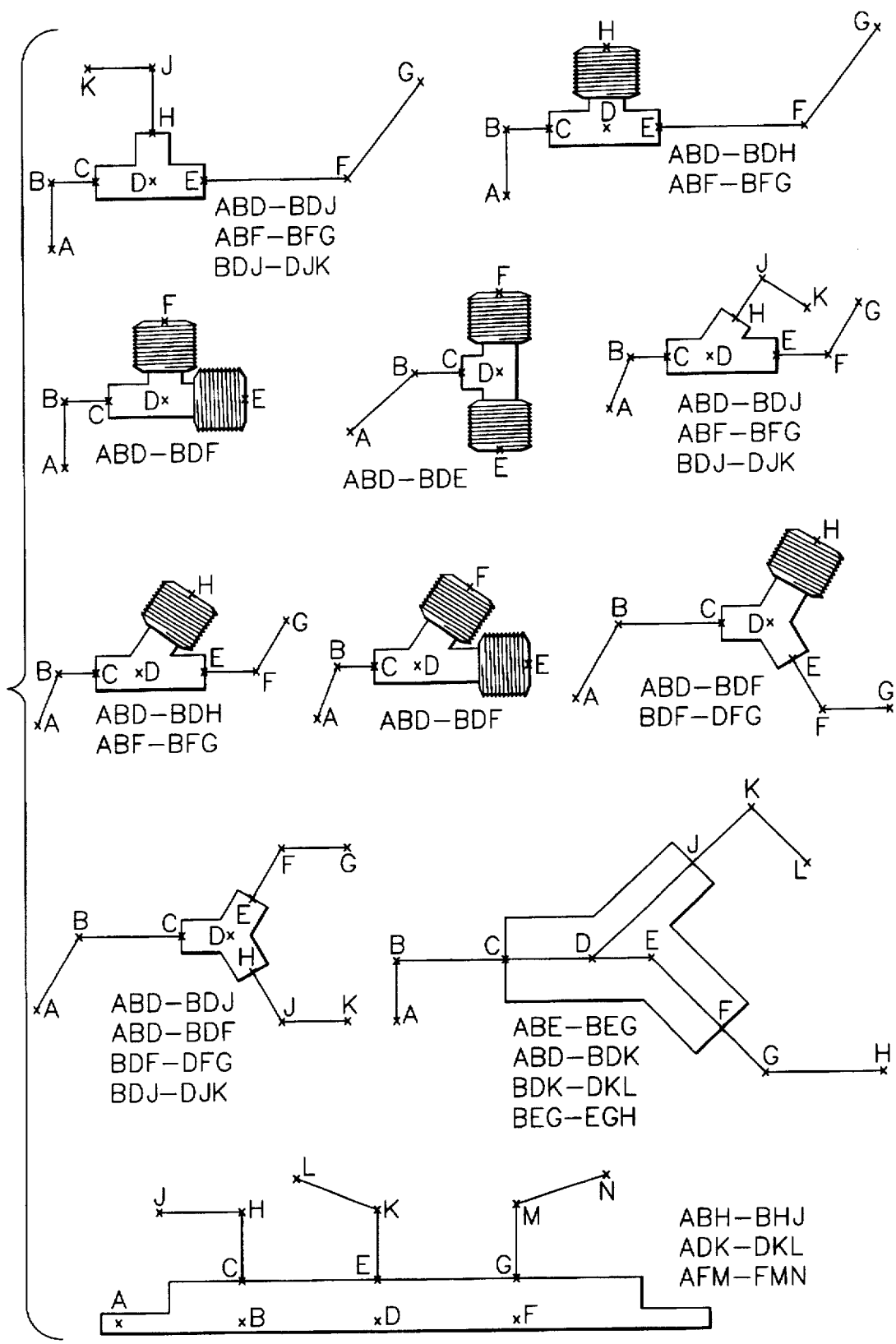

(b) Vertices, port TCPs and port direction TCPs are used to define the planes in this table (c) The turntable angles for different configurations of above types of fittings are presented in FIGS. 27 and 28.

6. Tube hose source control table

For tube hose assemblies, one additional table is generated on the drawing. This table defines the approved suppliers for the part. The user is presented with a list of all allowable sources in a list widget and any of the source can be switched off before the creation of the table. The approved sources and their CAGE numbers are read from an ASCII file maintained by the system manager.

C. Tube View Placement

The detail drawing of a tube assembly contains two tube views. One view is the main inspection plane view and the other view is an auxiliary view, e.g., top, bottom, left or right view. This function automatically places these views on the face of the drawing. The second view name is taken from the option menu setting for the tube view from the main dialog. The placement of views is decided by the system. Views are placed in such a way as not to interfere with tables and drawing format. The view scale is rounded to the nearest tenth.

If the user wishes to change the auxiliary view, the user selects the desired auxiliary view name from the option menu and then depress the main view placement icon. The system replaces the existing views with the new ones.

D. Fitting View Placement

Figure 29:
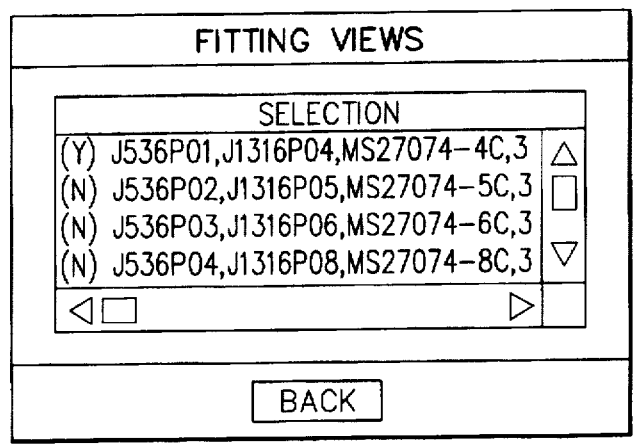
FIG. 29 is a fitting view placement dialog.

This function allows the user to place the detail views of the standard library fittings on the drawing. When the user selects this option, a dialog as shown in FIG. 29 is displayed by the system. This dialog contains a scrollable listing box which lists all the standard fittings used in the inseparable assembly. The fittings are identified in this listing with their component nomenclature and a fitting eight digit identification. The first word of each record representing fittings. A "Y" or "N" letter in brackets shows the status of the fitting as to whether it is detailed already. The user selects a fitting from this list by clicking the pointer on it. When the user selects the fitting to be detailed, the system highlights the fitting in the assembly as well as the detail view if it exists. Subsequently, the user is prompted to select a location to place the fitting detail.

If the fitting view is not present in the drawing, the system opens the part file containing the detail view and to edit its TCP labels, item numbers and view header. After this modification, the view will be part merged to the location user specified.

If the fitting detail view is already present in the drawing, the view is moved to the new location.

E. Notes Generation And Placement

This function allows the user to select the note package, and place it on the drawing. There are two categories of notes, namely, standard notes and optional notes. The standard notes are selected by the system from the parameters set by the user for note selection. Optional notes are individually selected by the user. Once a note packet is identified, then that note package is constructed from ASCII files and placed on the drawing.

The input is as follows.

1. A part file containing a drawing. Some of the information needed to select the note package is entered in the assembly identification module. Therefore, the user should have executed that module previously.
2. An ASCII file indicating what note package to use based on the assembly. This file is named "selection_matrix".
3. An ASCII file of single notes that make up the note packages. This file is named "single_notes".
4. An ASCII file of notes package definitions, i.e., individual notes that make up each package. This file is named "package_def".

The output of this module is the drawing with the proper note package.

Figure 30:
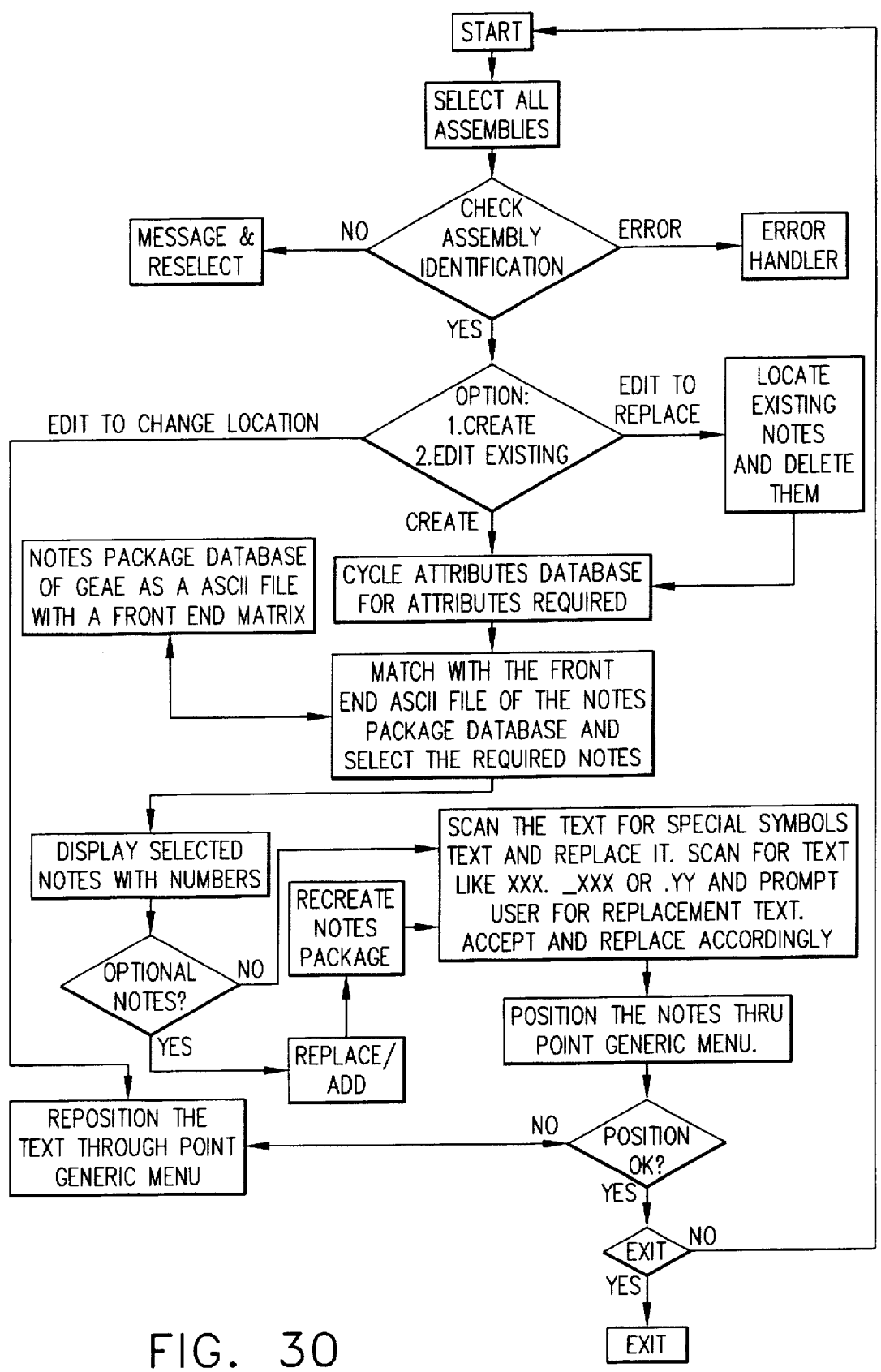
FIG. 30 is a flow chart for the notes selection and placement.

FIG. 30 is a flow chart illustrating a sequence of process steps for the notes selection and placement module. Particularly, the module has three options on its dialogue box, namely, Create, Edit and Exit. Selecting Create enables creation of a new notes package based on the attributes data available in the assemblies. Selecting Edit enables the user to recreate the notes package, add or replace optional notes and reposition the notes off the drawing. Selecting Exit returns processing to the previous menu.

If the user selects Create, the assembly components that have been identified are examined. A selection menu with each of these parameters set to the values determined above is then displayed, along with a motif toggle "radio button" to allow the user to override those values.

When the user is satisfied with the parameters and selects the OK button, the system uses the parameters and the "selection_matrix" ASCII file to determine the note package needed and constructs that note package. To create the package, the system reads the "package_def" file and builds each package using the note identifiers.

For example, for the First entry in the "package_def" file which is b1001b,100001,100002, the individual notes that make up the package from the "single_notes" file between the BEGIN and END lines of the 100001 and 100002 entries are obtained. If the users selection does not match any of the criteria available in the selection matrix, an error message will be given and no notes are created.

The selected notes are numbered in increasing order from bottom to top and displayed in a separate window. The user is given the option to use any of the optional notes from the optional notes package. If the user selects Yes, then another window is displayed showing the optional notes. The optional notes are scrollable motif windows. The user then selects the optional notes by selecting the optional notes number as displayed in the window. The user can either Add optional notes to the notes package or Replace an individual note. Depending on the selection, appropriate action is taken and the notes package is renumbered.

The system also determines the total height of the text generated and compares it with the available height on the drawing sheet. The height available on the drawing sheet is the vertical distance between the top line of the title block and the bottom line of the top of the drawing sheet minus notes_top_space and notes_bottom_space. The two defaults will be picked from the defaults_file. If the height available on the drawing sheet is less than the height of the notes package, then the program splits the notes package in two columns with the new column coming on the left of the existing text. The notes are split so that each column starts and ends with a complete note. The notes generated are placed on the sheet at a distance of notes_bottom_space above the title block and notes_right space from the innermost right line of the drawing format. If the user wants, the text can be repositioned using the UG Generic Point Menu or except the default.

A part attribute "icds_note_pkg" with the value of the note package also is created or updated. This allows the drawing format and title block annotation module to annotate the drawing format with the notes package identifier number.

If the user selects Edit, the existing note package, reposition of the existing note package can be replaced or the optional note logic described above can be executed.

The following replacement logic is available both in the create and edit mode. Particularly, if the notes contain the following embedded variable fields: "XXX", ".XXX", ".YY", then the user is prompted for replacement values. The three variables have the following valid inputs.

a. "XXX" Positive Integer Only (Maximum 3 digits)
b. ".XXX" Any alphanumeric character string but maximum three characters long
C. ".YY" Either of 0.02 or 0.03

The notes may also contain an "*" followed by an alpha character which automatically replaces the value with a symbol.

F. Item Ballooning

The ICDS tubing system assigns item numbers for fitting components and tube segments as they are placed and routed in the assembly. The inseparable tube assembly has the item number 1. The assembly item number appears on the drawing near a table which gives the assembly identification number. The standard fitting item numbers are placed in the detail view of the fitting. For user defined fittings, the item numbers appear in the inspection plane view. Item numbers for the tube segments appear in the tube detail definition table, created by the charts generation function.

The item ballooning function reorders the numbers fitting components first and then the segments, and updates the item balloons on the components in the fitting detail views. This function also places the item numbers of the user defined fittings in the inspection plane view. If the reordering affected the tube detail table, the table is regenerated. The main assembly identification table with item number 1 is also generated by this function.

G. TCP label placement

This function automatically places labels of TCP names on the drawing main tube views with leader lines pointing to point entities at TCP locations. No user input is required for this function.

H. Template Drawing

A tube template is a drawing containing the tube centerlines without bends. The template drawing is the model view in the XY plane of the inspection coordinate system to a one to one scale. A line perpendicular to the tube run and one and a half times the tube diameter of length on either side of the center line is drawn at following points:

(a) All free end TCPs of fittings and tubes, (b) All segment end TCPs, (c) The mid points of all straight runs, (d) All off tube centerline and on tube centerline TCPs, and (e) All bolt location TCPs (locking point TCPS).

The points in the template drawing are same as that in the inspection coordinate table. A diamond marker is placed at the wearsleeve locations. A rectangular marker is placed at the free end points. A '+' sign is placed at the vertices and port direction TCPs. The cross lines at the mid points of straight runs are annotated with the straight length name on one end of the cross line. The cross lines at all other points are annotated with the TCP label on either end of the cross line. The template drawing also contains a table which lists all the inspection points with their Z coordinate in the inspection coordinate system and the true angle. The Z coordinates are offset to have the minimum Z point 5" above the XY plane of inspection coordinate system.

Fitting Library Creation Utility

Figure 31:
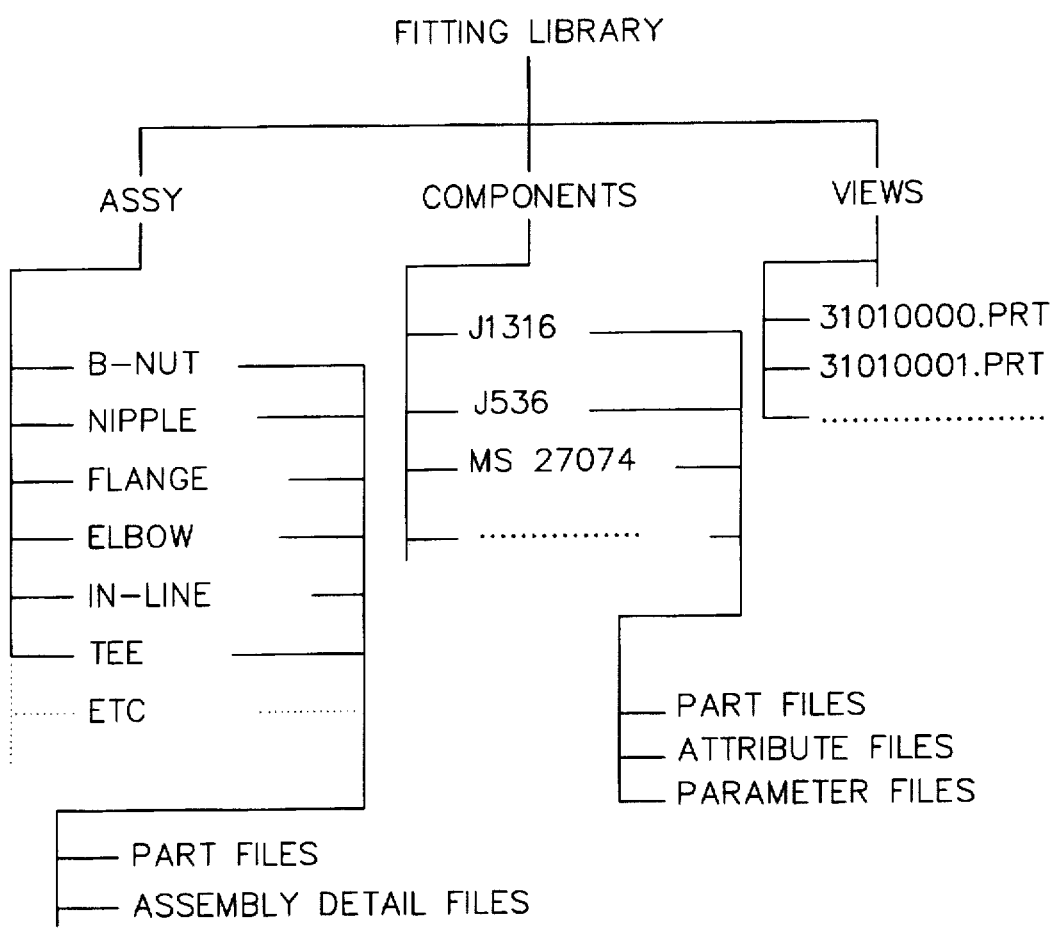
FIG. 31 illustrates the standard fitting library structure.

Standard fittings are available in a library residing in the directory pointed by an environment variable 'ICDS_TUBE_FITLIB_DIR'. Under this directory, there are three sub-directories, namely, the fitting assembly directory, the components directory and the fitting view directory. FIG. 31 shows the structure of fitting library.

The assembly directory includes seven sub-directories. There is one sub-directory for each type of fitting: b-nut, nipple, flange, elbow, reducer, tee, wearsleeve, etc. The sub-directories contain assembly detail files for each fitting under their class. The assembly detail file has data to define the port diameter and thickness, material and fitting detail view drawing name. This file also defines the assembly method and its constituent components. The assembly file is used by the system to build a fitting part file if the fitting is not present in the assembly directory at run time. A newly created fitting is stored in the assembly directory and used at subsequent usages. Assembly files are stored with an eight digit name with '.assy' extension. Fitting assembly part files have the same eight digit name with '.prt' extension.

The components used by fitting assemblies are stored in the component directory. Each component has its own directory which is named as its J or M series numbered name. These directories contain one master parametric component with the same name as the directory with '.prt' extension. For each size of the component, there exists a parameter file and an attribute file. The parameter file contains the parametric values for the model of that size. The attribute file contains the part attributes for that size.

The views directory contains the detail view of each fitting. These views are used when the user requests detail views of fittings at the time of detailing.

The ICDS tubing system also includes a stand-alone external user function system named 'build_fitting'. This system takes as argument either a fitting name or 'all'. If a fitting name is passed as an argument, the system checks the existence of the assembly part file of the fitting. The system builds this fitting using the assembly detail file if the fitting is not present in the assembly directory or any of its component part file is modified. The component part file depends on its attribute and parameter files. If any of these files are modified after the component part file is saved, the component and fitting assembly part files are recreated. If the utility is run with 'all' as an argument, then all the fittings in the assembly directory are checked for modified component data. If any of the fitting's component data is modified, the component as well as the fitting will be recreated.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A design system for designing a tube for a gas turbine engine, said design system comprising a computer workstation having a plurality of executable modules stored therein, said modules comprising:

a tube design module for routing a tube for the engine said tube design module comprising a fitting selection and placement routine;

a tube editing module for editing tube assembly geometry; and a tube detailing module for preparing detail drawings.

2. A design system in accordance with claim 1 wherein said system is implemented as a user function sub-system to a computer aided design system.

3. A design system in accordance with claim 1 wherein said design system is implemented on a UNIX workstation.

4. A design system in accordance with claim 1 wherein said tube design module comprises a tube parameter setting routine, a tube definition routine, a tube control point creation routine, a tube control point naming routine, an inspection coordinate system definition routine, a data file generation routine, a display symbols routine, and a validation routine.

5. A design system in accordance with claim 1 wherein said tube editing module comprises an edit fitting section and an edit segment section.

6. A design module in accordance wtih claim 5 wherein said edit fitting section comprises a delete fitting routine and a transforming fitting routine.

7. A design module in accordance with claim 5 wherein said edit segment section comprises an edit tube parameters routine, a move fitting routine, an edit bend radius routine, a delete segment routine, a move vertex routine, a delete vertex routine, a connect tube to fitting routine, a disconnect tube routine, a split segment routine and a concatentating segements routine.

8. A design module in accordance with claim 1 wherein said tube detailing module for preparing detail drawings comprises a drawing format and annotation routine, a charts generation and placement routine, a tube view placement routine, a fitting view placement routine, a notes generation and placement routine, an item ballooning routine, a tube control point label placement routine, and a template drawing routine.

9. A computer for designing tubes for a gas turbine engine, said computer programmed to enable:

routing a tube along the engine;

selecting and placing fittings on the engine;

editing tube assembly geometry; and preparing detail drawings of the tube.

10. A computer in accordance with claim 9 wherein said computer is programmed to selectably execute a tube parameter setting routine, a tube definition routine, a fitting selection and placement routine, a tube control point creation routine, a tube control point naming routine, an inspection coordinate system definition routine, a data file generation routine, a display symbols routine, and a validation routine.

11. A computer in accordance with claim 9 wherein for editing tube assembly geometry, said computer is programmed to selectably execute an edit fitting section and an edit segment section.

12. A computer with claim 11 wherein said edit fitting section comprises a delete fitting routine and a transforming fitting routine.

13. A computer in accordance with claim 11 wherein said edit segment section comprises an edit tube parameters routine, a move fitting routine, an edit bend radius routine, a delete segment routine, a move vertex routine, a delete vertex routine, a connect tube to fitting routine, a disconnect tube routine, a split segment routine and a concatentating segements routine.

14. A computer in accordance with claim 9 wherein for preparing detail drawings of the tube, said comptuer is programmed to selectably execute a drawing format and annotation routine, a charts generation and placement routine, a tube view placement routine, a fitting view placement routine, a notes generation and placement routine, an item ballooning routine, a tube control point label placement routine, and a template drawing routine.

* * * * *